（12) United States Patent
Laux et al.

(10) Patent No.: US 7,526,520 B2
(45) Date of Patent: Apr. 28, 2009

(54) METHOD AND APPARATUS FOR PROVIDING A CLIENT BY A SERVER WITH AN INSTRUCTION DATA SET IN A PREDETERMINED FORMAT IN RESPONSE TO A CONTENT DATA REQUEST MESSAGE BY A CLIENT

(75) Inventors: Thorsten O. Laux, Hamburg (DE); Bernd Eilers, Hamburg (DE)

(73) Assignee: Sun Microsystems, Inc., Santa Clara, CA (US)

( * ) Notice: Subject to any disclaimer, the term of this patent is extended or adjusted under 35 U.S.C. 154(b) by 1579 days.

(21) Appl. No.: 10/025,497

(22) Filed: Dec. 26, 2001

(65) Prior Publication Data

US 2002/0095459 A1     Jul. 18, 2002

(30) Foreign Application Priority Data

Dec. 22, 2000   (EP)   .................................. 00128215

(51) Int. Cl.
  *G06F 15/16*   (2006.01)
  *G06F 15/177*  (2006.01)
(52) U.S. Cl. ...................... 709/203; 709/220
(58) Field of Classification Search ................ 709/231, 709/234
See application file for complete search history.

(56) References Cited

U.S. PATENT DOCUMENTS 5,706,434 A    1/1998  Kremen et al.
5,951,694 A    9/1999  Choquier et al.
5,974,430 A   10/1999  Mutschler, III et al.
6,009,425 A   12/1999  Mohan
6,892,230 B1 *  5/2005  Gu et al. ...................... 709/220
6,938,041 B1 *  8/2005  Brandow et al. .............. 707/10

FOREIGN PATENT DOCUMENTS

| EP | 1045302 A1 | 10/2000 |
| GB | 2331600 A | 5/1999 |
| WO | WO 99/57657 A1 | 11/1999 |
| WO | WO 00/56033 A1 | 9/2000 |
| WO | WO 00/67176 A2 | 11/2000 |
| WO | WO 00/78079 A1 | 12/2000 |

* cited by examiner

*Primary Examiner*—John Follansbee
*Assistant Examiner*—Karen C Tang
(74) *Attorney, Agent, or Firm*—Sonnenschein Nath & Rosenthal LLP

(57) ABSTRACT

In a data communication system, a client and a server perform a data communication, in particular to provide the client with a instruction data set in response to a content data request message made by client. An instruction format configuration file contains a tree data structure having a plurality of instruction format nodes, each instruction format node indicating a particular combination of instruction elements constituting a particular instruction format and having associated with it a node selection criterion. The program extracts and determines properties from the content data request issued by the client. The program searches the tree data structure with the determined properties in order to find an instruction format node, whose associated node selection condition matches the properties. Thus, the instruction data set returned to the client can be provided in a flexible manner.

45 Claims, 23 Drawing Sheets

HTTP REQUEST → 
HTTP RESPONSE (IDS,IF)

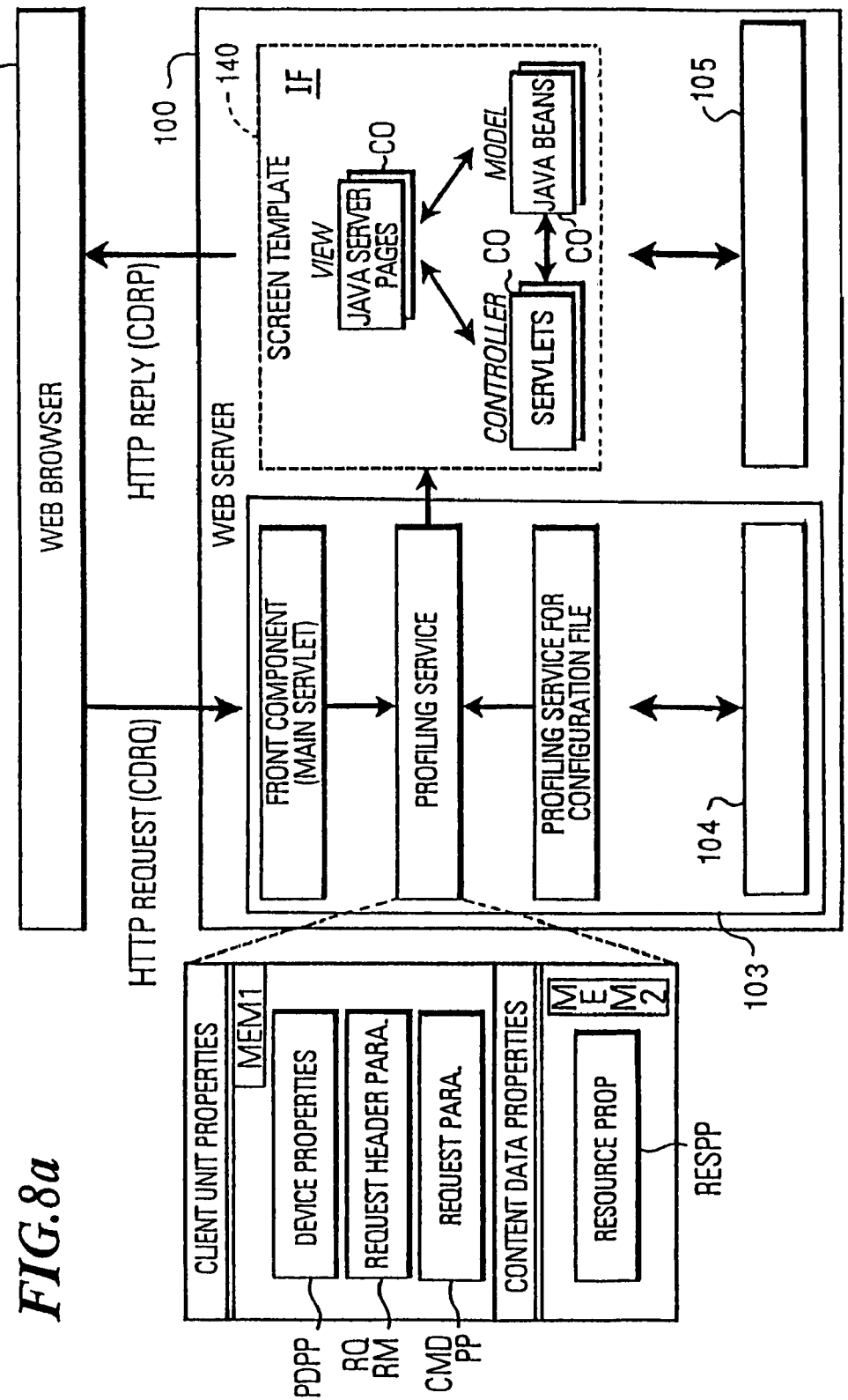

TREE STRUCTURE AFTER INCLUSION OF ALL cxml FILES

FIG.10b xml file for main nodes                                MAIN

```xml
<?xml version="1.0" encoding="ISO-8859-1"?>
<!-- sreen definitions -->
-<node>
    <!-- default screen -->
    -<screen template="/html/HTMLTemplate.jsp " class="default>
        <component name="Title"value="www.mydomain.com"direct="true"/>
       -<component name="Background" value="/html/HTMLBackground.jsp"/>
            <argument name="picture" value="$BACKGROUND_PICTURE"/>
        </component>
        <component name="Error" value="/html/HTMLError.jsp"/>
    </screen>
    <!-- execute login -->
-<node>
    -<operation type="and">
        <requirement type="requestParameter" name="cmd"
            value="execute_login"/>
        <requirement type="executionEnvironment" name="loginBean"
            value="null"/>
    </operation>
    <screen template="/portal/login" class="login"/>
</node>
    <!-- logout -->
-<node>
        <requirement type="requestParameter" name="cmd" value="logout"/>
        <screen template="/portal/logout" class="logout"/>
</node>
    <!-- include screen definition files for different devices supported
    -->
        <include file="etc/screenregistries/portal/ScreenRegistry_wml.xml" />
        <include file="etc/screenregistries/portal/ScreenRegistry_pqa.xml" />
        <include file="etc/screenregistries/portal/ScreenRegistry_xul.xml"  />
        <include file="etc/screenregistries/portal/ScreenRegistry_html.xml"/>
</node>
```

N0 points to the default screen block. RETYP points to the operation block. N1 points to the execute login node. N2 points to the logout node.

TREE VIEW FOR SOME HTML NODES OF THE SCREEN REGISTRY

FIG.10d  xml file of HTML nodes                 HTML

```xml
<?xml version= "1.0" encoding= "ISO-8859-1"?>
<!-- Screen definitions for standard HTML devices ( MSIE,Netscape, ...)
-->
- <node>
    - <operation type="or">
       - <operation type="not">
            <requirement type="ccpp" name="Browser.CCPPAccept.text/html"
               value="null" />
         </operation>
         <requirement type="requestHeaderParameter" name="user-agent"
            value="Mozilla*"/>
    </operation>
    <!-- login page -->
    - <node>
      - <operation type="or">
         - <operation type="and">
              <requirement type="executionEnvironment" name="loginBean"
                 value="null"/>
              <operation type="not">
                 <requirement type="requestParameter" name="cmd"
                    value="execute_login"/>
              </operation>
           </operation>
           <requirement type="requestParameter" name="page" value="login"/>
         </operation>
         - <screen ID ="Login.Screen" template= "/html/HTMLLoginTemplate.jsp"
              class="default">
              <component name="Title" value="HTMLLogin.title" direct="true"
                 base= "com.sun.star.portal.web.jsp.html"/>
              <component name="CurrentContent" value="/html/HTMLLogin.jsp" />
              <component name="Error" value= "/html/HTMLError.jsp"/>
           </screen>
       </node>
       <!-- welcome page -->
       - <node>
         - <operation type="or">
              <requirement type="executionEnvironment"
                 name= "UniversalContentBrockerContent" value="null"/>
              <requirement type="resourceProperty" name="PresentationURL"
                 value= "staroffice.private:factory/desktop" />
           </operation>
           <screen ID="Welcome.Screen" class="default">
              <component name="Title" value="HTMLWelcome.title" direct="true"
                 base= "com.sun.star.portal.web.jsp.html"/>
              <component name= "Shortcuts" value="/html/HTMLShortcuts.jsp"/>
              <component name= "CurrentContent"
                 value="/html/HTMLWelcome.jsp"/>
           </screen>
       </node>
       - <node>
         <!-- more HTML nodes ... -->
       </node>
       - <substitution name="$BACKGROUND_PICTURE">
         - <element>
              <requirement type= "userInformation" name="gender" value="f"/>
              <result value="HTMLWomensBackground.gif"/>
``` file: //V:\pat\ScreenRegistry_html.xml

Labels: H1, H1.1, H1.2, H1.3

FIG.10e

HTML
```
<element>
- <element>
    < <requirement type="userinformation" name="gender" value="m"/>
    <result value="HTMLMensBackground.gif"/>
  <element>
- <element>
    <result value="HTMLdefaultBackground.gif"/>
  </element>
 </substitution>
</node>
<!-- End standard HTML description -->
``` file: //V:\pat\ScreenRegistry_html.xml

WML NODES

WML     xml FILE OF WML NODES    *FIG.10g*

```xml
<?xml version="1.0" encoding="ISO-8859-1"?>
<!-- Screen definitions for WAP (WML) devices -->
<node>
  <operation type="or">
    <operation type="not">
      <requirement type="ccpp"
         name="Browser.CCPPAccept.text/vnd.wap.wml" value="null">
    </operation>
    <requirement type="requestHeaderParameter" name="user-agent"
       value="Wapalizer*"/>
    <requirement type="requestHeaderParameter" name="user-agent"
       value="Nokia*"/>
    <requirement type="requestHeaderParameter" name="user-agent"
       value="R380*"/>
    <requirement type="requestHeaderParameter" name="user-agent"
       value="ERKO UP/4.0.10*"/>
    <requirement type="requestHeaderParameter" name="user-agent"
       value="ALAV UP/4.0.10*"/>
    <requirement type="requestHeaderParameter" name="user-agent"
       value="SP01 UP/4.0.10*"/>
    <requirement type="requestHeaderParameter" name="user-agent"
       value="T250 UP/4.0.10*"/>
    <requirement type="requestHeaderParameter" name="user-agent"
       value="TM1K UP/4.0.10*"/>
    <requirement type="requestHeaderParameter" name="user-agent"
       value="MOT-CB/0.0.18 UP/4.0.10*"/>
    <requirement type="requestHeaderParameter" name="user-agent"
       value="SH UP/4.0.10*"/>
  </operation>
  <screen template="/wml/WMLTemplate.jsp" class="wml">
    <component name="Error" value="/wml/WMLError.jsp"/>
  </screen>
  <!-- login page -->
  <node>
    <operation type="or">
      <operation type="and">
        <requirement type="executionEnvironment" name="loginBean"
           value="null"/>
        <operation type="not">
          <requirement type="requestParameter" name="cmd"
             value="execute_login"/>
        </operation>
      </operation>
      <requirement type="requestParameter" name="page" value="login"/>
    </operation>
    <screen template="/wml/WMLLOginTemplate.jsp" class="login">
      <component name="Deck_1" value="/wmlWMLLogin.jsp"/>
      <component name="Error"  value="/wml/WMLError.jsp"/>
    </screen>
  </node>
  <!-- welcome page -->
  <node>
    <requirement type="executionEnvironment"
       name="UniversalContentBrockerContent" value="null"/>
    <screen class="wml">
      <componente name="Deck_1" value="wml/WMLWelcome.jsp"/>
``` file: //V:\pat\ScreenRegistry_wml.xml

FIG.10h

WML

```
    </screen>
  </node>
  <!-- module explorer -->
- <node>
  - <operation type="or">
      <requirement type="resourceProperty" name="protocol"
         value="file:"/>
      <requirement type="resourceProperty" name="protocol"
         value="ftp:"/>
    </operation>
  - <screen class="wml">
    - <component name="Deck_1" value="$WMLEXPLORER">
         <argument name="explorertype" value="explorer"/>
         <argument name="title" value="WMLExplorer.documents"/>
      </component>
    </screen>
    <node>
       <requirement type="requestParameter" name="cmd"
          value="viewPage"/>
     - <screen class="wml">
          <component name="Action" value="/portal/viewpage"/>
     - </screen>
    </node>
  - <node>
       <requirement type="requestParameter" name="cmd"
          value="rename"/>
     - <screen class="wml">
          <component name="Deck_1" value="WMLRename.jsp"/>
       </screen>
    </node>
  - <node>
       <requirement type="requestParameter" name="cmd" value="delete"/>
     - </screen class="wml">
          <component name="Action" value="/portal/delete"/>
       </screen>
    </node>
  - <node>
       <requirement type="requestParameter" name="cmd"
          value="execute_mail"/>
     - <screen class="wml">
          <component name="Action" value="/portal/mail"/>
        - <component name="Deck_1" value="$WMLEXPLORER">
           <argument name="explorertype" value="explorer"/>
           <argument name="title" value="WMLExplorer.documents"/>
         </component>
         <component name="Error"
            value="/wml/WMLMailSendError.jsp"/>
       </screen>
    </node>
  - <node>
       <requirement type="requestParameter" name="cmd"
          value="execute_new_folder"/>
     - <screen class="wml">
          <component name="Action" value="/portal/newFolder"/>
       </screen>
    </node>
  - <node>
```
file: //V:\pat\ScreenRegistry wml.xml

FIG.10i

WML

```
    <requirement type="requestParameter" name="submodule"/>
        value="menu"/>
  - <screen template="/wml/WMLTemplate.jsp" class="contextmenu">
        <component name="Deck_1" value="/wml/WMLCommands.jsp"/>
    </screen>
   </node>
  <node>
- <node>
   <!-- more WML nodes ... -->
  </node>
- <substitution name="$WMLEXPLORER" >
  - <element>
        <requirement type="requestParameter" name="viewTypeExplorer"
           value="fileview"/>
        <result value="/wml/WMLFileView.jsp"/>
    </element>
  - <element>
       <result value="/wml/WMLFolderView.jsp" />
    </element>
  </substitution>
 </node>
 <!-- End WAP (WML) description -->
``` file: //V:\pat\ScreenRegistry_wml.xml

METHOD AND APPARATUS FOR PROVIDING A CLIENT BY A SERVER WITH AN INSTRUCTION DATA SET IN A PREDETERMINED FORMAT IN RESPONSE TO A CONTENT DATA REQUEST MESSAGE BY A CLIENT

This application claims priority from EP 128215.1, filed Dec. 22, 2000, the contents of which are herein incorporated by reference.

BACKGROUND OF THE INVENTION

1. Field of the Invention

The present invention relates to a server of a data communication system in which one or more clients are provided by the server with an instruction data set in a particular instruction format in response to a content data request message issued by the client. In particular, the present invention provides a mechanism by which the instruction format of the instruction data set (for example, an HTML page) can be adapted, modified or varied depending on properties of the client as determined from the content data request message.

2. Description of the Related Art

Computers have been conveniently used for a wide range of applications, i.e., ranging from simple editing of text documents to complex distributed processing applications involving a large number of possibly distributed data processing units and involving the transfer of data between the data processing units.

With the growing number of data processing units having access to computer networks such as local area networks or world-wide networks, i.e., company-wide intranets or the Internet, a growing number of applications are offered which involve a plurality of data processing units. Such applications may be, for example, found in the field of home banking, office applications, remote e-mail applications, supercomputing applications or the like. In such data communication systems, high speed links, via permanent connections, circuit-switched connections or packet-switched connections, are used as communication links to exchange digital data at high speed (high-bit rates) such that even graphics data or data from moving images can be exchanged among the data processing units.

It is a typical feature in such data communications systems that it is not required that all participating data processing units have the same powerful processing capabilities. That is, a main computer having powerful computing facilities can serve a number of smaller sub-computers through one or more of the above-described communication links. Since typically the smaller sub-computers are only assigned the task of making access to a main computer and to request the processing facilities or data from the main computer whilst the main computer serves the data on the small sub-computers, the main computer is often referred to as a server and the small sub-computers are referred to as clients. In such a scenario a client may typically request the execution of an application program at the server and may receive a data processing result or content data from the server via the network or the communication link connecting the client and the server.

Furthermore, systems are known where a plurality of clients can connect to a portal for the execution of an application. A portal may be a large site in a network including a plurality of servers which provide a variety of services including, for example, office applications, searching functions, news functions, e-mail applications, discussion groups, on-line shopping and links to other sites on the network. A portal may thus, be a general purpose site offering the capability to perform applications on behalf of a client or assisting a client in executing the application.

Generally, in a client and server or portal scenario the server may be a large computing device which has also the resources to store and execute application programs which are used in providing services to a client. Since the applications and sufficient computing power are generally available at the server side, the client may be a data processing unit with less powerful computing resources, functioning as an interface to receive user commands required for execution of a desired application program when providing the request, i.e., to transmit commands from the client to the server, and further to receive and, for example, to display computation results from the server.

a. Conventional Server and Client Configuration

A typical data communication system 00 of the prior art is shown in FIG. 1. Here, a server 10 and clients 11, 12, 13, 14, ..., 15 communicate through communication links 20, possibly through an intranet 21 and/or the Internet 22. FIG. 2 shows a typical block diagram of a server 10 and a client 11 in accordance with the prior art. The server 10 and the client 11 communicate through a communication link 20 connected to a respective communication interface 23, 40.

Typically, the server 10 includes a server processor 26, a memory 27 with programs 28, the programs 28 having a data structure 29 therein, and a secondary storage 30, all connected by a bus 31.

Typically, the client 11 includes a client processor 41, a memory 42 with programs 43, the programs 43 having a data structure 44, a display 45 and an input 46.

FIG. 3 shows an example of operations or steps typically carried out by the client side and the server side for the typical scenario in FIG. 1.

b. Conventional Transfer of Content Data to the Client

For example, in case a user at a client side wishes to access a document from the server 10, i.e., a web-page available at the server 10 or another location, the user selects in step ST1 one of the programs 43 in memory 42, i.e., a particular browser, which is run on the client processor 41.

When the user clicks on a particular place on the screen, the program 42 sends a content data request CDRQ to the server 10 in step ST2. In the Internet protocol, such a request message CDRQ can typically be an HTPP message requesting the transfer, for example, of HTML-pages from a database 30 located within the server 10 (or located elsewhere outside the server 10), where the content data is stored. In this example, the HTTP-request message includes the URL from which the HTML-pages should be retrieved and some additional header information.

After setting up the communication link 20 between the client 11 and the server 10, the program 27 receives the content data request message CDRQ on the server side, in step ST3. Alternatively, the client 11 can also request the execution by the server 10 of some processing programs 27 in memory 28, so-called servlets or JAVAserver pages if the server is a JAVA® based server (JAVA® is a registered trademark of Sun Microsystems).

In step ST4, the program 27 statically or dynamically retrieves the requested content data, i.e., the HTML-pages. In a static retrieval, the program 27 by server processing unit 26 merely accesses a local database 30 and retrieves the content data, i.e., the HTML-pages. In a dynamic retrieval, the program 27 retrieves data also from a remote site in a dynamic manner. After the step ST4, a step ST5 follows in which the format of the content data for the client 11 is determined. This will be explained below.

In step ST6, the program 27 of the server 10 provides through the communication link 20 the retrieved content data, i.e., an instruction data set to the client side. In step ST7, the content data or the instruction data set is received on the client side by program 43, and in step ST8, the user at the client side has the option to display or print out the transferred content data on a display 45, on a disc, or a printer. If the requested content data are for example, web-pages (HTML-pages), typically complete data sets relating to one page are requested by program 43 and re-transferred to the client side. Therefore, if in step ST9 the user requires more content data, for example, further pages, i.e., data sets, from the server 10, the process continues with step ST2. If no further content data are required, the link 20 is closed after some time, for example, by stopping the browser in step ST10.

c. Structure of the Instruction Data Set

FIG. 4 shows an example of the HTTP request and HTTP reply scenario between the client 11 and the server 10 for the case where the data set to be transferred back to the client 11 contains content data which on the client 11 is to be used for a screen display. As shown in FIG. 4, in this example using HTML-pages, the HTML-page includes a screen layout format including a plurality of screen elements 51, 52. Here, the screen element 51 is a log-in element and the screen element 52 is a company logo. Furthermore, the screen layout 50 can, for example, include a particular background colour. That is, in the case of FIG. 4 the screen format is constituted by a data set which includes graphics data. In order for the client 11 to recognize that the transferred data set includes graphic element data sets, the program 28 includes an instruction format setup sequence on the server side to determine a so-called MIME-type which indicates the type of data contained in the HTML-page, used in this example, to be transferred to the client 11. Therefore, in the step ST5 in FIG. 3, the program 28 determines the MIME-type and transfers an indication of the MIME-type to the client 11 together with the data set in step ST6. On the basis of the MIME-type, the program 43 at the client 11 can recognize that the transferred data sets include graphics element data sets which can be displayed on the display 45. Thus, in this case, the transferred HTML-page used in this example, is intended merely for being displayed on the display screen 45.

However, the transferred data sets from the server 10 may not only constitute a graphics data set to be displayed on a display screen but can also be a general instruction data set which the user can use for other purposes in step ST8. For example, the user at the client 11 may request a transfer of a command data set for controlling a device on a client side, for example, a robot. That is, the client 11 may not necessarily use the transferred data set for a display but for a control of a device.

While in this case there is no necessity to display the commands on the display screen, the HTML-page used in this example, which is transferred from the server 10 by program 28, will nonetheless have a particular instruction format similar to the one shown for the screen layout in FIG. 4. That is, when the command data set is requested by program 43, it will also contain specific instruction elements corresponding to instruction element data sets in the instruction data set to be transferred to the client 11.

Hence, independently of what use is made at the client 11, every transferred instruction data set from server 10 will have a particular instruction format consisting of a plurality of instruction elements and the MIME-type will indicate to the client 11 the type of data which is transferred.

Thus, generally an instruction data set is transferred back to the client 11 by program 28 and this instruction data set will include a plurality of instruction element data sets corresponding to the particular instruction elements forming the data set. Therefore, display frames for local visualization at the client side or command frames for other use at the client side can be transmitted by program 28 from the server 10 to the client 11 as, for example, HTML-pages.

d. Structure of Data Requests

Furthermore, while in the above description it has been assumed that the program 43 merely sends a content data request CDRQ to the server 10, of course, more complex operation commands can be transmitted to the server side in a similar manner. For example, in case the client 11 wishes to scroll through a document, a corresponding input command is given via input 46 to the browser and is transmitted via the communication link 20 to the server 10. In turn, the program 28 at the server 10 prepares a corresponding display content for transfer to the client 11 in order to enable the client 11 to locally visualize the changed display content. Similarly, in case the user wishes to edit the document, respective commands could be transmitted from the program 43 at the client 11 to the server 10 and accordingly be processed at the server 10. Changed display contents (content data) can then again be transmitted to the client 11 for the local visualization on the display 45.

However, it is also possible, that not only the server 10 has the necessary resources to provide a desired service, but a client 11 may already have the required resources for providing the service such as rendering operations or editing a data file. Corresponding application programs may thus be available at both the client side, i.e., an applet, and the server side, i.e., a servlet, for performing a desired operation, i.e., providing a desired service. Such programs are also available as one of the programs 43 shown on the client side in FIG. 2.

Since on the client side different browsers or different processing programs 43 can be executed or different devices can be used on the client side, the server side must also have knowledge about what type of program is run in order to determine in which manner the retrieved content data should be provided back to the client 11.

Typically, when the program 43 issues the content data request CDRQ, the request also contains request parameters, request header parameters, device properties and resource properties.

Device properties are used in conjunction with the client 11. These properties refer to such things as the different display sizes of the client devices.

Resource properties cover all the properties that are assigned to a requested document or more generally to a resource. This, for example, includes the various document types (Star Office documents, Star Office write, Star Office calculator or other document formats such as PDF as well as customized content types used for folders, for example).

Since the server 10 can be accessed by different browsers, for example, Netscape browser 4.X and the Internet Explorer, special add-ins are required in each browser such that a document can be edited. To enable the dynamic download of the correct add-in, the browser type can be identified via request header parameters of the request message CDRQ.

Finally, for the above-described custom commands issued by the program 43 at the client 11, so-called request parameters are available in the request message CDRQ such that the commands can be recognized on the server side.

e. Disadvantages

Despite the fact that according to the prior art it is already possible to transfer in the content data request CDRQ (i.e., a HTTP-request) information of the request parameters, request header parameters, device properties and resource properties, the program 28 at the server 10 simply retrieves the content data (i.e., HTML-page) and determines the MIME-type and then provides back to the client 11 a corresponding data set including a fixed instruction format determined by the MIME-type. That is, despite the fact that some information about the client properties and/or resource properties are transferred to the server 10 in the request message CDRQ sent by program 43, the format of the data set transferred back to the client 11 by program 28 is fixed, i.e., independent of the properties. Thus, independent of the capabilities of the client 11, the same format will always be used (only the MIME-type is determined to tell the client 11 what type of data is retransferred). Consequently, the program 28 uses a page set up which is a rather fixed frame or instruction data set format when re-transferring the requested data. Thus, the main disadvantage results that, independently of the capabilities of the client device, the executed browsing program, the set options on the browsing program and the type and size of the requested content data, the instruction format (screen format or command format) remains the same.

That is, it would generally be desirable to provide a flexible and extendable framework for creating content depending on the client 11 or resource properties, i.e., the server 10 should be capable of changing the instruction format depending on the client capabilities and the type of requested content data.

SUMMARY OF THE INVENTION

Methods and systems consistent with the present invention provide an improved server and a method for exchanging data between the server and the client in a data communication system which allow the server to make the instruction format of the instruction data set flexibly dependent on the capabilities of the client and the properties of the requested content data.

Methods and systems consistent with the present invention allow the program at the server to make the generation and retrieval of the content data and its format dependent on the properties of the client and the properties of the resources. For this purpose the program at the server selects from a number of instruction format templates a particular instruction format template dependent on a client or resource properties.

The template describes at what positions in the data set particular instruction elements can be placed. The program generates an instruction to fill the data inserted in the places indicated in the instruction format template, based upon the client capabilities or resource capabilities.

In order to specially select the instruction format template, the program searches a tree node structure based on the client or resource properties wherein each node corresponds to a particular template or a particular combination of instruction elements. When the properties with which the search is done, match a node selection criterion associated with each node, the program executes the particular template or combination of instruction elements.

Thus, a flexible and extendable framework for creating content is provided by providing a new way of registering new content creation servlets and by changing how existing content is created. The tree structure for the search thus makes it easy for the program to select and execute the appropriate instruction elements for flexibly adapting the instruction format.

Thus, methods and systems consistent with the present invention include a data processing system in a client and server system, the server providing the client with an instruction data set in a specified instruction format in response to a content data request from the client, the system including a server computer having a memory including a server program that provides at least one content data request properties of the content data request made by the client, that prepares the instruction data set having the specified instruction format and including a plurality of instruction element data sets each representing a specified instruction element of the instruction format and generated by at least one instruction element generating application in an instruction format set up sequence, that includes an instruction format configuration file containing a tree data structure including a plurality of instruction format nodes, each of the instruction format nodes indicating a particular combination of instruction elements having the specified instruction format and having associated with it a node selection criterion, that searches the tree data structure with said determined content data request properties and selects an instruction format node whose associated node selection condition matches the determined content data request properties, and that prepares the instruction data set to be sent to the client by executing the instruction element generating application of the selected instruction format node; and a processor that runs the server program.

The server program analyzes the content data request to provide one or more of client unit related properties and content data related properties, and provides for each client as the client unit related properties device, properties about the client. The server program also provides as the content data related properties resource properties about data content resources providing the content data, provides as the client unit related properties, properties about the content data requesting unit used at the client; and provides as the client unit related properties, properties about commands issued at the client.

The server program analyzes a first content data request to obtain the client unit related properties and the content data related properties, wherein at an arrival of any subsequent content data request in a same session the server program only accesses one of the first storage area and said second storage area in memory, to provide the at least one of client unit related properties and the content data related properties.

The node selection condition includes at least one node selection requirement including at least one property name parameter and an expected property; wherein the search is started at a root instruction format node; wherein a property relating to the property name parameter of the node selection condition of a next instruction format node is requested to be provided for the current data request; and wherein when the provided property matches with the expected property, the instruction format selection branches to the next instruction format node. The node selection requirement further includes a property type parameter indicating a type of property provided, and further includes at least one operation condition for logically combining results of at least two requirements.

The instruction format formed by instruction elements of a root instruction format node of the tree data structure is a default instruction format, wherein the default instruction format is an instruction format with an instruction template and a plurality of instruction element positions into which the instruction element generating applications insert instruction element data sets when they are executed. The instruction format includes an instruction template and a plurality of instruction element positions into which the instruction element generating applications insert instruction element data sets when they are executed.

The instruction element generating application includes a component name of a component to be executed, and includes an argument name with a substitution name of a substitution component located at a different node.

The instruction data set is a set of instruction data for displaying a screen with a particular screen layout format on the client, wherein the instruction template is a screen layout template and the instruction element positions are place holders into which the insert screen element data sets are inserted by the instruction element generating application when the instruction element generating application is executed. The instruction data set is a set of instruction data for controlling a device with a specified control command layout format on the client, wherein the instruction template is a command layout template and the instruction element positions are command holders into which the instruction element generating application inserts command data sets when the instruction element generating application is executed.

The client and the server are JAVA based applications, and the instruction format configuration file containing the tree data structure is an XML file. The instruction element generating application is one of a JAVA servlet and a JAVA server pages program.

In another embodiment consistent with the present invention, a method in a data processing system for providing in a client and server system, at least one client by a server with an instruction data set in a specified instruction format in response to a content data request, includes the steps of providing at least one content data request properties of a content data request made by the client; preparing the instruction data set having the specified instruction format and including a plurality of instruction element data sets each representing a specified instruction element of the specified instruction format; searching a tree data structure stored in an instruction format configuration file and including a plurality of instruction format nodes, each instruction format node indicating a specified combination of instruction elements including the specified instruction format and having associated with it a node selection criterion, with the determined content data request properties and for selecting an instruction format node whose associated node selection condition matches the determined content data request properties; and preparing the instruction data set to be sent to the client by executing instruction element generating applications of the selected instruction format node.

Methods and systems consistent with the present invention include a computer readable medium containing instructions that cause a data processing system to perform a method of providing in a client and server system, at least one client by a server with an instruction data set in a specified instruction format in response to a content data request, the method including the steps of providing at least one content data request properties of a content data request made by the client; preparing the instruction data set having the specified instruction format and including a plurality of instruction element data sets each representing a specified instruction element of the specified instruction format; searching a tree data structure stored in an instruction format configuration file and including a plurality of instruction format nodes, each instruction format node indicating a specified combination of instruction elements including the specified instruction format and having associated with it a node selection criterion, with the determined content data request properties and for selecting an instruction format node whose associated node selection condition matches the determined content data request properties; and preparing the instruction data set to be sent to the client by executing instruction element generating applications of the selected instruction format node.

Methods and systems consistent with present invention include a tree data structure in memory of a server in a data processing system of a client and server system, in which at least one client is provided by the server with an instruction data set in a specified instruction format in response to a content data request, the tree data structure including a plurality of instruction format nodes, each instruction format node indicating a specified combination of instruction elements including a particular instruction format and having associated with it a node selection criterion.

The tree data structure is generated separately for each session between the client and the server, and can be generated once and independently for each session between the client and the server. Further, the tree data structure is generated dependent on at least one of client-related properties and content data properties.

Methods and systems consistent with the present invention include a method in a data processing system for providing one or more clients by a server in a client and server system, with an instruction data set in a specified instruction format in response to a content data request, including the steps of preparing a tree data structure consisting of a plurality of instruction format nodes, each instruction format node indicating a particular combination of instruction elements including a specified instruction format and having associated with it a node selection criterion; and searching the tree data structure with content data request properties relating to the content data request sent by the client and for selecting an instruction format node whose associated node selection condition matches the content data request properties.

Methods and systems consistent with the present invention include a method in a data processing system for providing one or more clients by a server in a client and server system, with an instruction data set in a specified instruction format, including the steps of selecting from a number of instruction format templates a specified instruction format template dependent on at least one of client properties and resource properties, wherein the template describes at what places in the instruction data set specified instruction elements can be placed; and inserting content data in the places indicated in the instruction format template by at least one instruction element generating application; wherein the selection step also including selecting said at least one instruction element generating application in accordance with one of client capabilities and resource capabilities, from more than one available instruction element generating application.

Methods and systems consistent with the present invention include a data processing system in a client and server system, the server providing the client with an instruction data set in a specified instruction format in response to a content data request from the client, the system including a server computer having a memory including a server program that provides one or more content data request properties of the content data request made by the client, that prepares the instruction data set having the specified instruction format and including a plurality of instruction element data sets each representing a specified instruction element of the instruction format and generated by at least one instruction element generating application in an instruction format set up sequence, that includes an instruction format configuration file containing a tree data structure including a plurality of instruction format nodes, each of the instruction format nodes indicating a particular combination of instruction elements having the specified instruction format and having associated with it a node selection criterion, that searches the tree data structure with the determined content data request properties and selects an instruction format node whose associated node selection condition matches the determined content data request properties, and that prepares the instruction data set to be sent to the client by executing the instruction element generating application of the selected instruction format node; and a processor that runs the server program; a client computer including a memory having a client program that provides a content data request to the server, and that receives the instruction data set sent by the server; and a processor that runs the client program; and a network between the server computer and the client computer.

There has thus been outlined, rather broadly, some features consistent with the present invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 5b depicts a flowchart of a client and server system in accordance with FIG. 5a;

FIG. 5c depicts a portion of a client and server system consistent with FIG. 5a;

FIG. 6 depicts content of portions of the client and server system in accordance with FIG. 5a;

FIG. 7b depicts a flowchart of a client and server system consistent with FIG. 7a;

FIG. 8a depicts a data processing system in a client and server system consistent with one embodiment of the present invention;

FIG. 8b depicts a portion of the client and server system consistent with FIG. 8a;

FIG. 10b depicts a representation of a tree structure in accordance with FIG. 10a;

FIG. 10c depicts a tree structure for the sub-nodes of the tree structure in accordance with FIG. 10a;

FIGS. 10d-10e depict the definition of the sub-nodes in accordance with FIG. 10c; and FIGS. 10f-10i depict the definition of the sub-nodes in accordance with FIG. 10f.

DETAILED DESCRIPTION OF THE PREFERRED EMBODIMENTS.

Methods and systems consistent with the present invention include a data communications system in which a server exchanges data with a client, and wherein the server is allowed to make the instruction format of the instruction data set flexibly dependent on the capabilities of the client and the properties of the requested content data.

Methods and systems consistent with the present invention include a data processing system in a client and server system, which uses an algorithm that travels through a set of interconnected nodes, where each node contains conditions that must be checked in order to determine the way to travel towards a final end point, and where each node on the way to that end point can define components for an instruction data set (IDS), and where also at each node an instruction data set template can be defined which can use the inclusion of such components in order to determine their position in the instruction data set (IDS).

In the following, the elements of the server 100 will be outlined in further detail. It is noted that this example serves as illustration purposes only and does not limit the methods and systems consistent with the present invention. Further examples of the server 100 are possible.

Figure 5A:
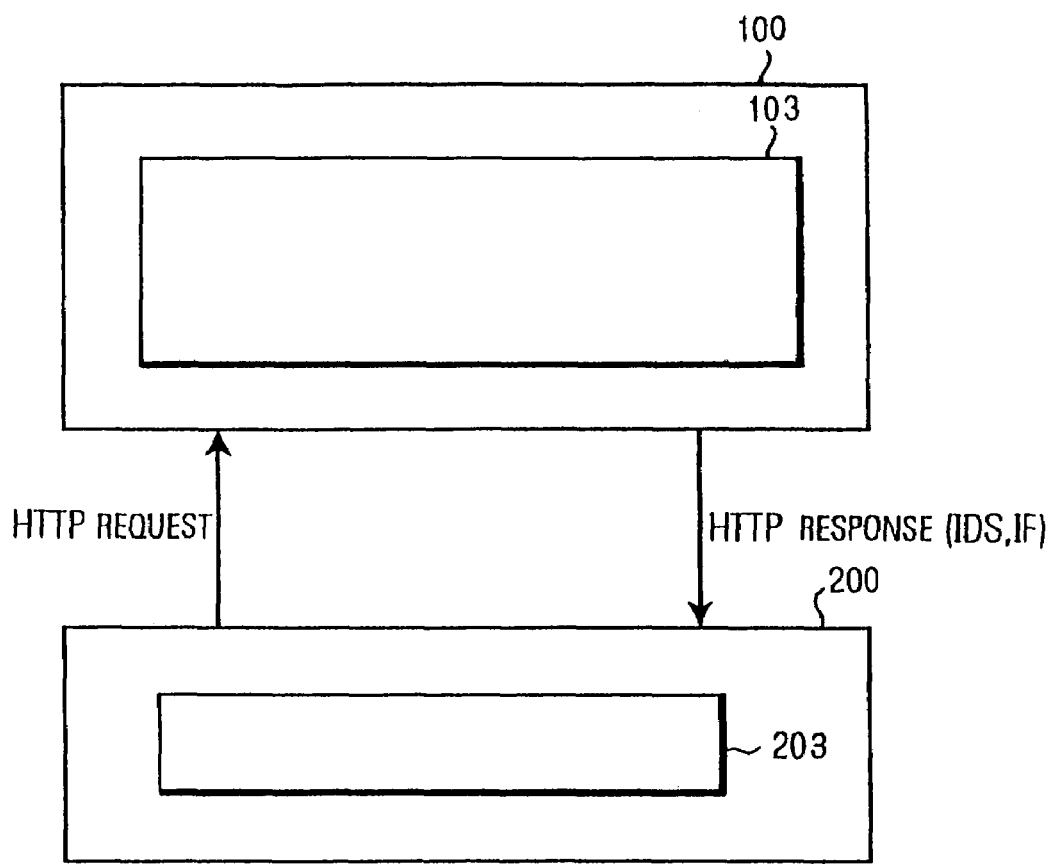
FIG. 5a depicts a portion of a data processing system in a client and server system in accordance with one embodiment consistent with the present invention.
Figure 5C:
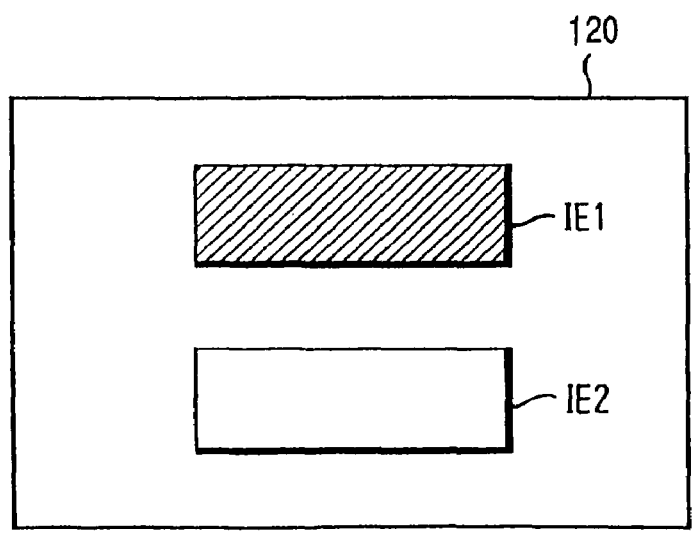
Figure 5B:
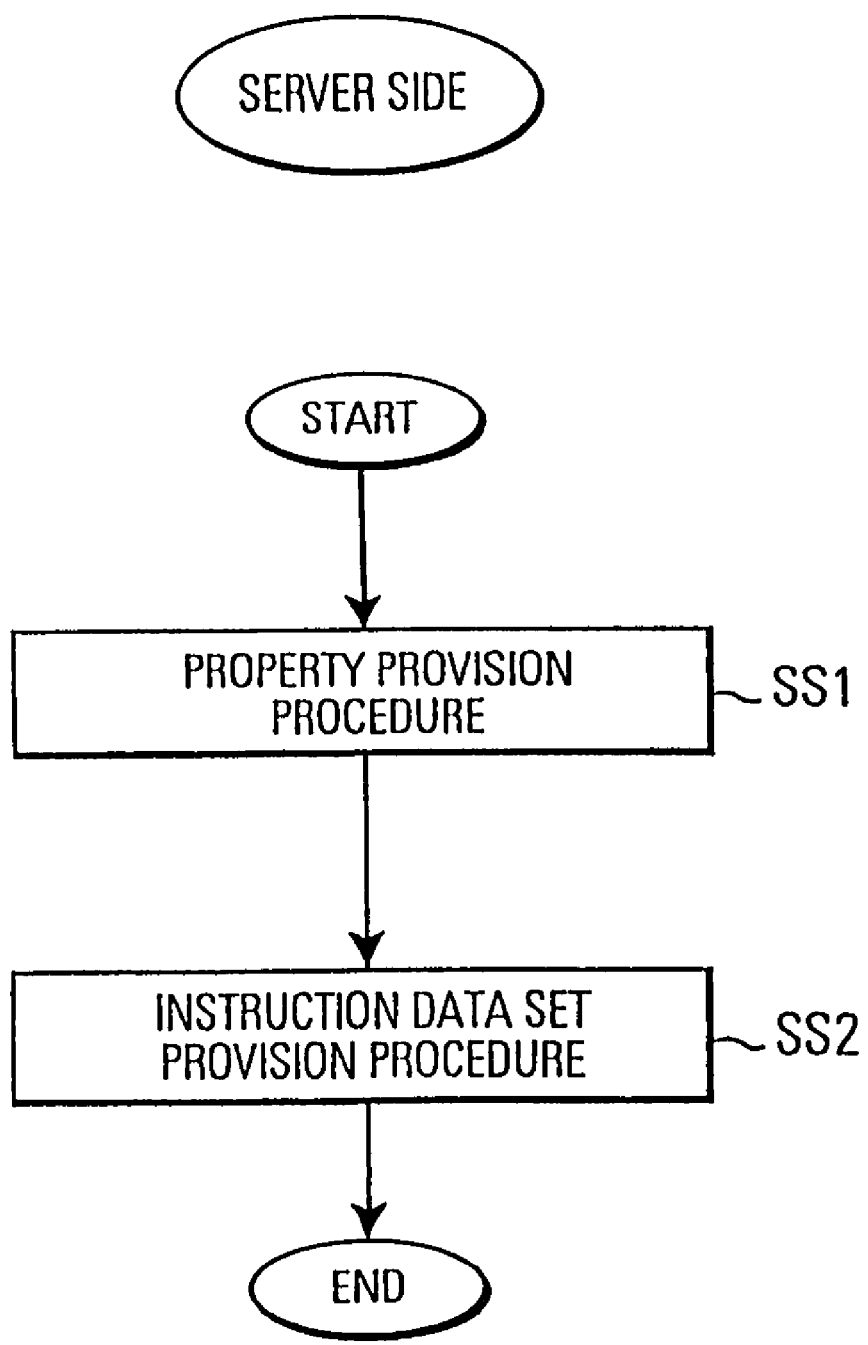
Figure 5D:
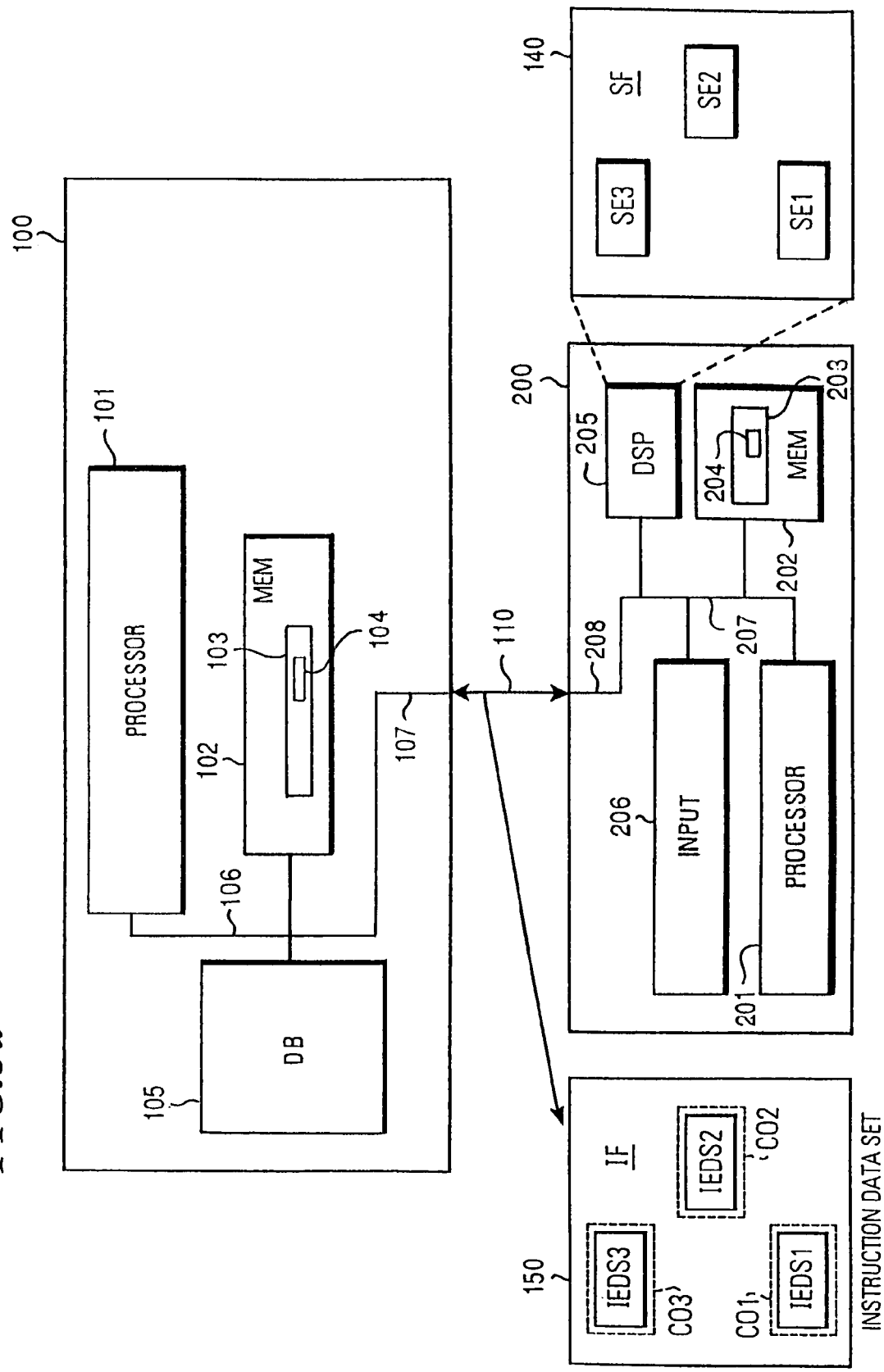
FIG. 5d depicts a data processing system in a client and server system in accordance with an embodiment consistent with the present invention.

Methods and systems consistent with the present invention include, in FIG. 5d, the server 100 may be a general purpose data processor, preferably a data processor with large resources, i.e., high processing capabilities and large memories for storing large amounts of data. The server 100 may be a single unit or may be a distributed system of a plurality of servers 100 or data processors and may be shared by multiple users.

The server 100 includes a processor 101 or processing means, which may be constituted by a central processing unit of the server 100, but may also be constituted by a distributed central processing unit including a plurality of individual processors on one or a plurality of machines. The server data processor 101 may have access to a server memory 102 or storage means for storing preferably a program 1103 or a large number of application programs 103 for providing various services to users, i.e., for performing various operations desired by users operating clients such as the client 200. The program 103 may include a data structure 103 therein.

The server processor 101 and the memory 102, as well as any other separate units such as a database or secondary storage 105 as secondary storage means, are connected by a communication link 106, which may be constituted by a system bus or the like, or by external connections, particularly in case the server 100 is constituted by a distributed system included distributed server data processing units and/or distributed server communication units.

The server communication link 106 may correspond to the client communication link 208. However, the server communication link 106 may be adapted, by program 103, to communicate with a plurality of clients such as the client unit 200, i.e., to maintain communication links to a plurality of clients 200.

Communications between the server 100 and the client 200 may be carried out through a communication link 110, such as a dedicated communication link, a wireless communication link, or may be established through a communication network such as a local area, company-wide intranet or a wide area network as the Internet. It is also possible that the communication link includes combinations of the above examples.

The communication link 110 may also be used for further communications, including bidirectional communications, particularly if the execution of the distributed application, i.e., the application requires the transmission of information from the client 200 to the server 100, i.e., in controlling the server 100 during execution of the distributed application.

The elements of the client 200 will now be outlined in further detail. It is noted that this example serves as illustration purposes only and does not limit the methods and systems consistent with the present invention. Further examples of the client 200 are possible.

Figure 1:
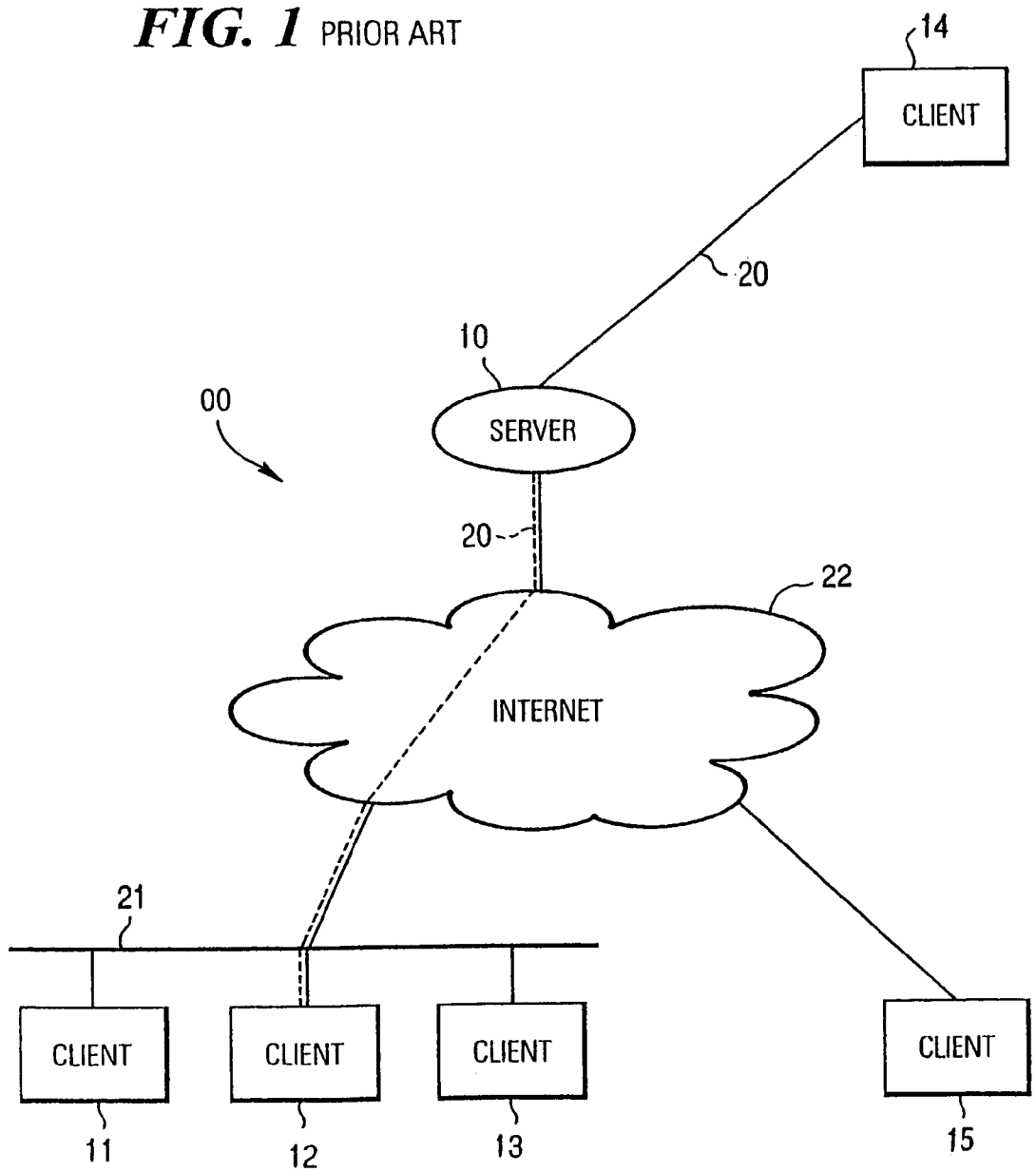
FIG. 1 depicts a client and server system in accordance with the prior art.

The client 200 may be a general purpose data processing device, such as a personal computer, a mobile terminal such as a mobile computing device, a mobile phone or a mobile data organizer operated by a user wishing to access a service remote from the client 200, i.e., at the server 100. Even though only a single client 200 is illustrated in FIG. 1, other embodiments may include a plurality of similar clients 200 connected to the server 100.

In one embodiment consistent with the present invention, FIG. 5d depicts a client 200 including a client data processor or processing means 201, which may be a central processing unit of the client 200 or may be a processing unit external to the client 200.

The client processor 201 may have access to a memory 202 or storage means for storing a program 203, and program elements of a distributed application to be executed on the server 100 and the client 200. The memory 202 may be located within the client 200 or external thereto. The program 203 may also include a data structure 204.

The client 200 may also include a display 205, and an input device 206 as input means.

The communication link 207 connecting the processor 201 (and any other separate units), the memory 202, the display 205, and input device 206, may be a system bus 207 for exchanging data between these elements; however, may also include external connections, i.e., connections to the input device 206 or keyboard, or to other data processing devices and the like.

A client communication link 208 may communicate, by program 203, with the server 100 using a communication end point specified by an address and a port number. The communication link 208 may be a dedicated communication link such as a mobile communication link or a switched circuit communication link. Further, the communication link may involve a network of data processing devices such as a local area network or a wide area network or combinations thereof. The client communication link 208 may be adapted by program 203 to execute various communication protocols. Communications protocols may for example be TCP/IP or any other point-to-point connection.

It is noted that the above described features and processing operations may be realized by dedicated hardware or may be realized as programs including code instructions executed on data processing units, i.e., the server 100 and the client 200. It is further possible that parts of the above sequences of operations are carried out in hardware, whereas others of the above processing operations are carried out using software.

Although aspects of one implementation are depicted as being stored in memory, one skilled in the art will appreciate that all or part of systems and methods consistent with the present invention may be stored on or read from other computer-readable media, such as secondary storage devices, like hard disks, floppy disks, and CD-ROM; a carrier wave received from a network such as the Internet; or other forms of ROM or RAM either currently known or later developed. Further, although specific components of data processing system have been described, one skilled in the art will appreciate that a data processing system suitable for use with methods and systems consistent with the present invention may contain additional or different components.

Methods and systems consistent with one embodiment of the present invention include the program 103 retrieving content data (i.e., HTML pages) from a database 105, as shown in FIG. 5d. Further, as shown in FIG. 5a, the program 103 at the server 100, by using a screen registry application, provides an instruction data set (IDS) 150 in a particular instruction format IF to the client 200. The screen registry generally contains two storage areas or memories. The server 100 is to provide an instruction data set 150 in a particular instruction format IF to the client 200. This is generally done by means of a HTTP response message, as was explained above. The screen registry provides some information P on the capabilities of the client 200 and/or the properties of content data, i.e., from the content data requested by the client 200.

Thus, the program 103 at the server 100 is adapted to make the instruction format IF of the instruction data set 150 flexibly dependent on the capabilities of the client 200 and/or the properties P of the content data CD. That is, as shown in the embodiment of FIG. 5b consistent with the present invention, first there is a property provision procedure or step SS1 in which the program 103 provides the capabilities (properties) of the client 200 and/or information on properties of some content data CD. Then, there follows an instruction data set provision procedure or step SS2, in which the instruction data set 150 adapted for example, in its format in accordance with the determined properties, is provided by the program 103 to the client 200. Thus, the data set 150 is flexibly dependent on the properties of the client 200 and/or the content data.

According to another embodiment consistent with the present invention, as shown also in FIG. 5a, the program 103 provides the properties P to the data base 105, which stores the content data CD, which is possibly requested by the client 200. Then, the program 103 at the server 100 makes the generation and retrieval of content data CD and its format flexibly dependent on the properties of the client 200 and/or the properties of resource units, which provide the content data CD. Therefore, according to this embodiment consistent with the present invention, the retrieval of the data and not only the adaptation of its format, can be made flexibly dependent on the relevant properties.

Whilst in accordance with one embodiment consistent with the present invention, the program 103 has already stored the client or content data related properties in the screen registry, for example the client-related properties in a first memory and the content data related properties in a second memory, the program 103 (see the more detailed block diagram in FIG. 5*d* to be described below) is adapted to analyze a content data request (i.e., the HTTP request) in order to find out the one or more client-related properties and content data related properties.

The properties detected from the content data request can be used for many other purposes in addition to the purpose of flexibly retrieving and/or adapting of the format of the instruction data set (IDS) 150. However, advantageously, the flexible retrieval of a content data and/or the changing of the format of the instruction data set (IDS) 150 can be varied in accordance with the properties which have been determined by analyzing the content data request. Thus, the content of the first memory and the second memory, i.e., the relevant properties stored therein, can determine the formatting and/or retrieving and processing of the content data.

According to another embodiment, it is very advantageous, if the generation of the instruction data set (IDS) 150 by the program 103 is separated into two parts, namely in a first part, in which the program 103 selects from a number of instruction format templates a particular instruction format template 120 as shown in FIG. 5*c*. This template 120 describes at what places in the instruction data set (IDS) 150 particular instruction elements IE can be placed. As will be understood from FIG. 5*a*, such a selection of an instruction format template 120 can be made dependent on the client properties P. Thus, in accordance with different properties, different templates can be selected.

Furthermore, the template 120 selected by the selection sequence of the program 103 in accordance with the properties, can include places into which the program 103 will insert data, as already indicated with the hatched portion in FIG. 5*c*. The program 103 can also select for each of the pre-specified places IE1, IE2 in the selected template 120, in accordance with the client capabilities or resource capabilities P. Therefore, the program 103 and its selection of the template and/or the insertion of the data into the places selected can be made dependent on the properties P provided by the screen registry 103.

In accordance with another embodiment consistent with the present invention, the aforementioned selection procedures, which are dependent on the client properties and resource properties can be made by searching a tree structure in a configuration file with the client-related and/or content data related properties. In a tree structure, each node generates the instruction data set with a different instruction format IF. Thus, a tree structure 130 (see for example FIG. 6) is used for flexibly generating the instruction data set using program 103, for example, by the program 103 flexibly selecting the template and generating the respective instruction elements, for example, which are also dependent on the client properties and/or the content data properties.

As will also be described below with more details, in accordance with one embodiment consistent with the present invention, the tree structure 130 can be in an XML configuration file, wherein each node in the tree structure generates the instruction data set (IDS) 150 in a different instruction format IF with a screen template 120 generated by a template jsp (JAVA Server Pages) or a servlet with a set of argument servlets and describing at what positions the arguments are to be inserted in the template 120.

Above, it was already explained that the screen registry application of program 103 provides the properties relating to the client 200 and/or the resources providing the content data. However, the properties may also relate to other factors of external influences and the provided properties used for the selection are not restricted to the client properties and the resource properties detected from the content data request message. Any other type of property can therefore be used for the selection procedure.

Furthermore, in accordance with one embodiment consistent with the present invention, the tree structure 130 is fixed and is independent from the individual sessions built up between the server 100 and the client 200. In accordance with another embodiment, the tree structure 130 in the configuration file can, however, be set new during each session. Furthermore, in accordance with yet another embodiment consistent with the present invention, it is also possible that the tree structure 130 itself is made dependent on the properties, i.e., the client-related properties and/or the content data or resource properties.

Therefore, in the description of the other embodiments consistent with the present invention, it should be noted that many operations and units can operate dependent on properties, even if they are not explicitly described. Thus, a full flexibility is obtained in providing the instruction data set (IDS) 150 to the client 200 in an as flexible as possible manner. This flexible adaptation procedure is hereinafter described with further embodiments consistent with the present invention, wherein further details of the above described general embodiments will become apparent.

a. Detailed Configuration of the Server and the Client

Figure 7A:
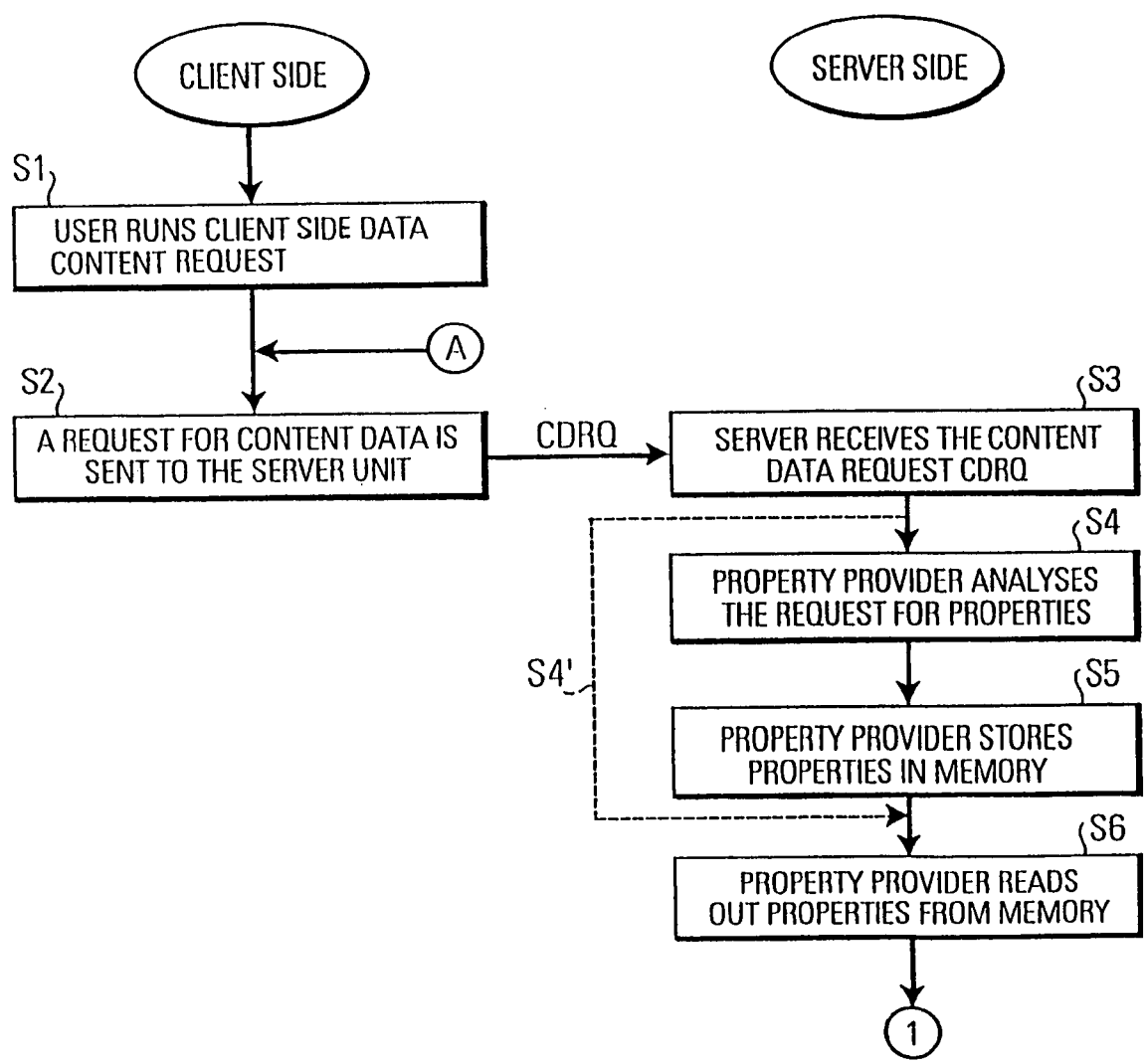
FIG. 7a depicts a flowchart of a client and server system according to one embodiment consistent with the present invention.
Figure 7B:
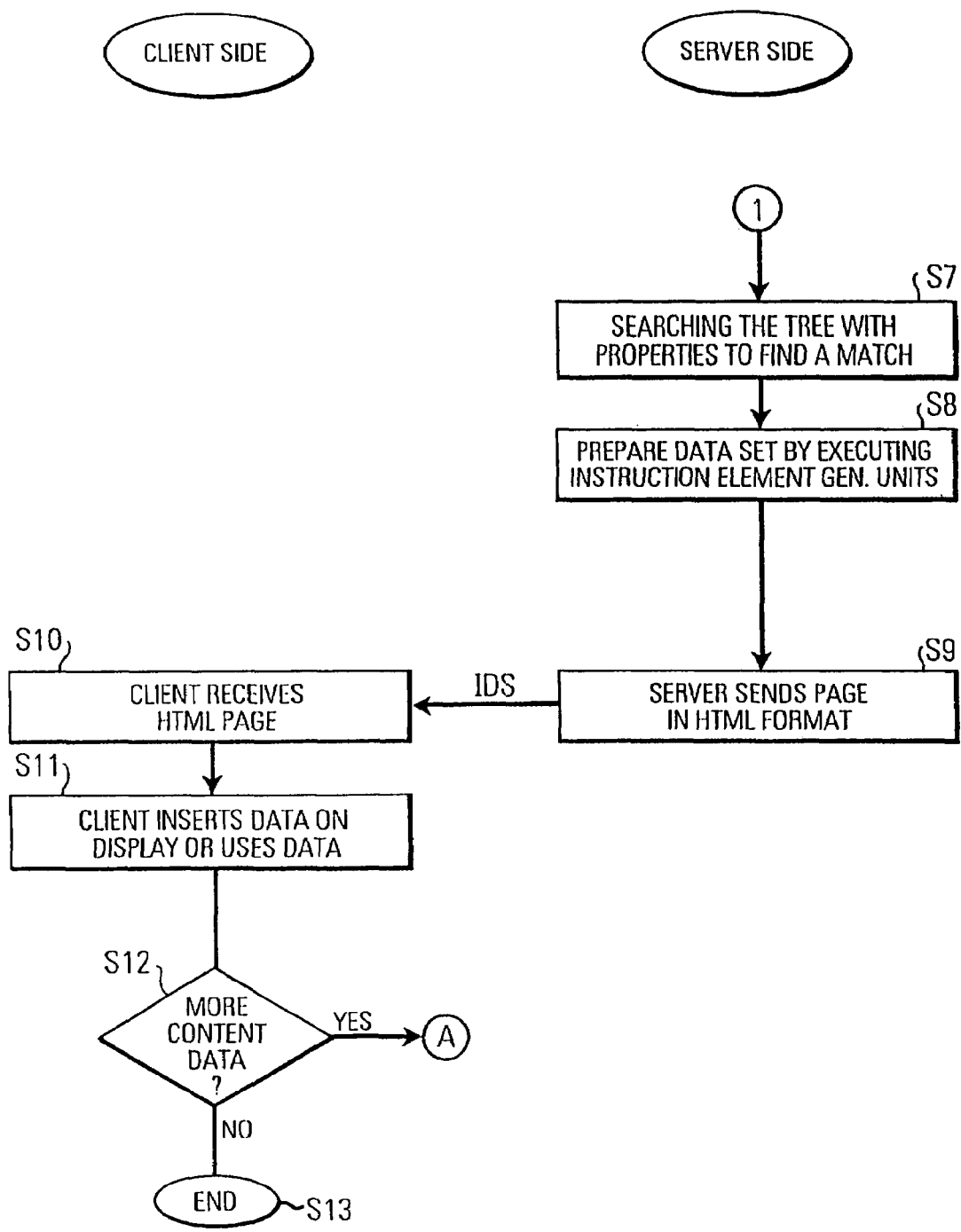

Methods and systems consistent with a first embodiment of the present invention will be described with reference to FIG. 5*d*, as described above, showing a server 100 and a client 200 and FIGS. 7*a*, 7*b* showing operations or steps when communicating messages between the server 100 and the client 200.

Figure 2:
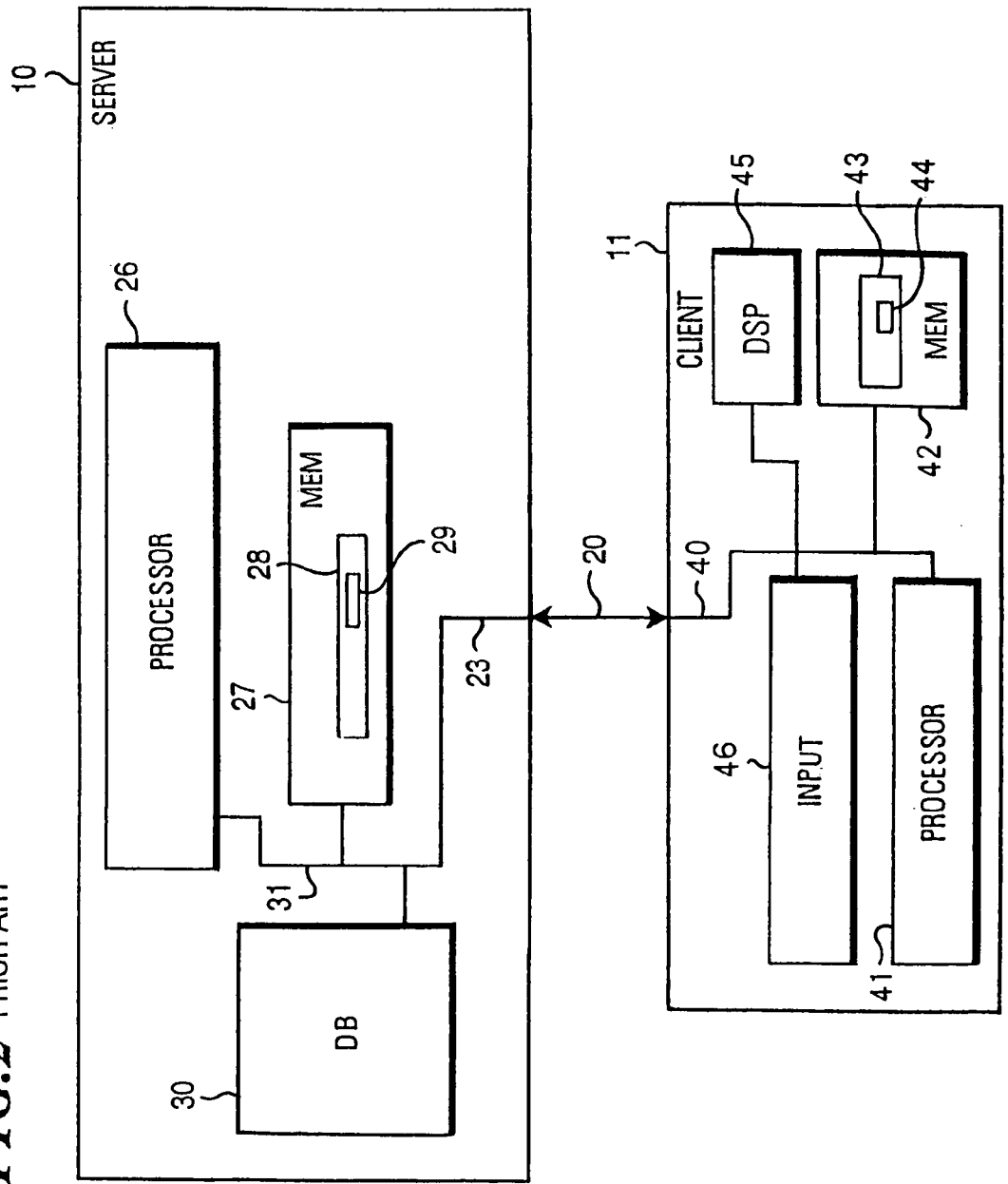
FIG. 2 depicts a data processing system for use in a client and server system consistent with FIG. 1.

The prior art server 10 in FIG. 2, also the server 100 in FIG. 5*d* can receive a content data request CDRQ from the program 203 in client unit 200, can retrieve content data using program 103, for example, directly in a static way from the local database 105, or in a dynamic manner by executing a servlet to acquire the content data from a remote location. The program 103 carries out this collection of content data and can transfer back to the client 200 a response message including the content data as a data set, for example, as an instruction data set in a particular instruction format IF.

In addition, the program 103 at the server 100 in FIG. 5*d* includes a screen registry application containing a content data request property provider, an instruction format set up, an instruction format configuration file, and an instruction format selection. As will be explained below with specific reference to the individual functions carried out by the program 103, the overall purpose of the screen/instruction registry application is to obtain from a received content data request CDRQ certain properties about the client 200 and the required resources and to perform a flexible adaptation of the instruction format IF of the content data to be sent back to the client 200. Thus, the instruction data set 150 will be formed by different instruction elements generated by the program 103 and specially selected in accordance with the detected properties.

The client 200 shown in FIG. 5*d* includes, as the prior art client 11 in FIG. 2, a client processor 201, a display 205, with the program 203 in memory 202 including a number of content data requesters, such as different browser programs which are run on the client processor 201. Each of these programs 203 is adapted to output content data requests to the server 100. Furthermore, of course, the client 200 can also issue commands, either as part of the content data request or as a separate message.

The instruction format set up of the program 203 has a similar function as the page set up of the prior art—namely to set up a special screen format when displaying the content data transferred back from the server 100 on the display unit 205.

Thus, FIG. 5d shows a server 100 of a data communication system in which one or more clients 200 are provided by the server 100 with an instruction data set in a particular instruction format in response to a content data request CDRQ issued by the client 200. Since the instruction data set (IDS) 150, and in particular its instruction format, is an advantageous aspect of embodiments consistent with the present invention described herein, hereinafter the general structure of the instruction data set (IDS) 150 is explained.

b. Configuration of the Instruction Data Set

Although the program 203 at the client 200 may desire via the content data request CDRQ that some graphics display data, for example, in the form of HTML-pages, is transferred back as content data, of course, the communication link 110 and in fact also the program 103 at the server 100, do not distinguish between graphics data or other type of data, for example, command data, in as far the transfer over the communication link 110 is concerned. Since the content data request and response procedure is carried out in a one-to-one relationship, i.e., for each content data request one instruction data set (IDS) 150 is transferred back, it is useful to regard the content data transferred back from the server 100 as one complete data set (instruction data set) which is self-contained and contains certain types of sub-data sets.

That is, the instruction data set (IDS) 150 is composed by a plurality of instruction element data sets (IEDS1-IEDS3) each representing a particular instruction element IE of the complete instruction format IF. The instruction element data sets IEDS1-IEDS3 can be distributed over the complete instruction data set (IDS) 150 as shown schematically on the left-hand side of the client 200 in FIG. 5d. If the instruction data set (IDS) 150 relates to a graphics data set, the graphics screen display obtained with such an instruction data set (IDS) 150 is as an example shown on the right-hand side of the client 200. Thus, each particular instruction element data set IEDS1-IEDS3 would correspond to a specific screen element SE1-SE3 displayed at specific positions on the screen 140. Thus, a specific screen format SF would be built up.

Of course, it should be understood that there need not necessarily be a one-to-one positional relationship between the instruction element data sets IEDS1-IEDS3 and the positions of the screen elements SE1-SE3. The illustration in FIG. 5d should only make clear that each individual instruction element data set IEDS1-IEDS3 will form a particular screen element SE1-SE3. However, of course, the instruction data set (IDS) 150 will also comprise an instruction format IF, that is the instruction format IF indicates via the instruction element data sets IEDS1-IEDS3 the format of the screen 140 which will eventually be displayed on the display unit 205.

On the server side, each of the instruction element data sets IEDS1-IEDS3 will have been generated by a specially selected instruction element generating unit CO1-CO3 of the instruction format set up of program 103, as indicated with dashed lines in the instruction data set (IDS) 150 in FIG. 5d.

Having understood the relationship between the instruction format IF and the example of the screen format SF, a first advantage is that the instruction format IF and the screen format SF respectively, i.e., the positional placement of screen elements SE1-SE3 on the screen 140, can be selected in a flexible manner in accordance with the properties of a content data request. A second advantage of the invention is, once the instruction or screen format has been set, to allow a flexible filling of the instruction elements or screen elements with content data, also dependent on properties extracted from a content data request.

Incidentally, the above explanation equally well holds for the case where content data in the form of command data is transferred, instead of graphics screen data. As explained above, also in this case, the data set transferred from the program 103 at server 100 will have to have a certain "instruction format", i.e., how the individual command element data sets will be sequentially arranged into main commands and subcommands, for example, for controlling a device on the client 200, i.e., a robot.

Hereinafter, with reference to FIG. 5d, FIG. 6, FIG. 7 and FIG. 8, the procedure to adapt the instruction format or screen format (screen layout) dependent on properties of the content data request by using a tree structure (FIG. 6) in will be explained with regard to several embodiments consistent with the present invention.

c. Provision of Content Data Request Properties

Hereinafter, the procedure of providing a flexible instruction or screen format is also referred to as "screen registry operation" or "profiling service".

Since the screen registry operation of program 103 is made dependent on properties of the client 200 or properties of the resources providing the content data, the actual adaptation procedure is preceded by a property provision procedure or step as shown in FIG. 7a.

In step S1, a client side content data request application in program 203 is run by the user, i.e., a browser program, a communication link 110 to the server unit 100 is set up and the content data request CDRQ is sent from the client 200 to the server 100 in step S2 via communication link 110 and the respective communication links 107, 110. In step S3, the program 103 of the server 100 receives this content data request message CDRQ.

As shown in FIG. 8a, in accordance with one embodiment consistent with the present invention, the content data request CDRQ is a HTTP-request issued by program 203, such as a web browser, and the request message reception is a front component or front end including a MainServlet of program 103. This MainServlet in program 103 receives all requests made by the different clients.

In step S4, the program 103 (forming together with the instruction format set up the profiling service) analyses the content data request CDRQ with respect to its properties.

In step S5, the program 103, in accordance with one embodiment consistent with the present invention, stores the extracted properties in one or more areas MEM1, MEM2 of the memory 202. When requested, the program 103 by selecting the instruction format, can read out the stored properties from the memory 202 in step S6.

To obtain a minimum amount of property information, at least the first content data request message CDRQ must be analysed by the program 103 with respect to the properties in the step S4. However, in the request-response scenario (one content date request will exactly be answered by one data-set (i.e., an HTML-page), of course, it is possible that the same client 200 will issue further content data requests CDRQs. In this case, it is not necessary that the program 103 always extracts the same property information from all subsequent content data request messages CDRQ and it can be sufficient, in the same session, that the program 103 only accesses the memory 202 in step S6 to provide for the client 200 indicated in the content data request CDRQ, the related properties. That is, with subsequent content data requests, CDRQ, the steps S4, S5 may be skipped (see the bypass operation S4'). Furthermore, in accordance with another embodiment consistent with the present invention, it is also possible that the properties are kept or updated from session to session. That is, if in one session some properties have been determined (through one or more analyses of one or more content data requests in the same session by program 103), these properties can be "carried forward" to the next session, i.e., if there are permanently stored in the storage areas MEM1, MEM2 of memory 202.

Furthermore, it should be noted that properties belonging to two or more different clients can be cross-coupled, from request to request in one session, or from session to session. That is, it is also possible that a first client carries some properties which are relevant also for other clients. For example, the content data request to be analysed on the server side may contain additional information about a backup client up to be used in case of failure of the first client. Furthermore, there may be clusters of linked clients such that some information may indeed be common to a sub-group of clients. This could for example be the case if all clients of a company have the same type of device, such that a device identification could be commonly assigned for all clients in the server on the basis of only a single content data request from a single client.

Furthermore, in accordance with yet another embodiment consistent with the present invention, it is also possible that the server evaluates or processes all properties of all clients together to obtain common information for all clients.

Furthermore, it is also possible that an instruction data set of a first client is not flexibly adapted or varied in accordance with the properties relating to such a first client but it is also possible that this first client instruction data set is varied in accordance with properties obtained for one or more other clients.

Therefore, in the analyzing and storage steps S4, S5 the program 103 will analyze and store properties separately for different clients such that, when prompted to provide specific properties in the profiling procedure, will be capable of providing properties on a client specific basis.

A skilled person will understand that a content data request CDRQ, i.e., the HTTP-request shown in FIG. 8a, can include a large number of identifications and parameters from which the program 103 can analyze and extract the desired properties. Such properties may be categorised as client-related properties PDPP, RQRM, CMDPP, and content data-related properties RESPP, as shown in FIG. 8a.

Therefore, in accordance with one embodiment consistent with the present invention, the program 103 shown in FIG. 8a, can include a device property provider application for providing for each client 200 as the client-related properties device properties about the client device, a resource property provider application for providing as the content data-related properties resource properties about data content resources CDRES and about the content data, the program 103 for providing as the client-related properties about the content data request used at the clients, and a command property provider application for providing as the client-related properties also properties about command issued at the clients. The memory 202 can include a first property memory MEM1 for client-related properties and a second memory MEM2 for content-related properties.

In accordance with one embodiment consistent with the present invention, the device properties are generally used in connection with the client device 200. Such properties refer to things as the different display sizes on the device. In accordance with one embodiment consistent with the present invention, the resource properties can cover properties, which are assigned to a requested document or more generally to a content data resource. Such properties, for example, include the various document types (Star Office documents, Star Office writer, Star Office calculator or other document formats such as PDF as well as customized content types used for folders, for example).

As explained above, since the program 203 can use different browsers, i.e., Netscape Browser 4.X and the Internet Explorer, the type of content data requests as one of the client-related property can be identified by request header parameters in the content data request message CDRQ.

Finally, it is possible to supply additional information with each request in order to have custom commands run. These additional details are contained as request parameters in the request message. This is another example for the client unit-related properties regarding issued commands.

As already briefly explained above, in order to avoid having to transfer a large number of additional parameters, in particular with respect to the request parameters, request header parameters, resource properties and device properties, the program 103 can collect and store as attributes properties or property parameters in one HTTP session, or can they can also be stored, updated and reused from session to session, and the properties my also be cross-related between different clients. In this way, it is not necessary to send all the parameters with subsequent requests, and instead of this, the details of previous requests can be accessed in storage areas MEM1, MEM2 of memory 202 separately for each client 200 (that is, the steps S4, S5 in FIG. 7a can be skipped with the operation S4').

A skilled person will realize that a great variety of properties depending on the type of request message and the type of processing can be stored in the memories and that the aforementioned examples are only examples for the device properties, resource properties, request header parameters and request parameters based on which such properties can be determined.

Finally, at the junction ①in FIG. 7a, the program 103 is in a position to provide one or more content data request properties determined on the basis of one or more content data requests made by separate clients. This can be done on the basis of a first or of several content data requests CDRQ.

Hereinafter, the following is explained as to how these properties, determined in FIG. 7a, are used by the profiling service in order to set up a flexible instruction or screen format.

d. Format Adaptation Procedure Using a Tree Structure

As described above, at the junction ① the program 103 is in a position to provide properties whenever it is requested to do so. Now, the following is an explanation as to how these properties are used to build up a flexible instruction or screen format.

As illustrated in FIG. 5d, the program 103, using an instruction format set up application, prepares an instruction data set (IDS) 150 having a particular instruction format (IF) and consisting of a plurality of instruction element data sets IEDS1-IEDS3, each representing a particular instruction element of the instruction format (IF) 150 and generated by one or more instruction element generating applications CO1-CO3. The fact that each instruction element generated will produce a separate instruction element data set is also apparent from FIG. 6 which shows the relationship between the set up and a tree structure in an instruction format configuration file of the screen registry.

Figure 6:
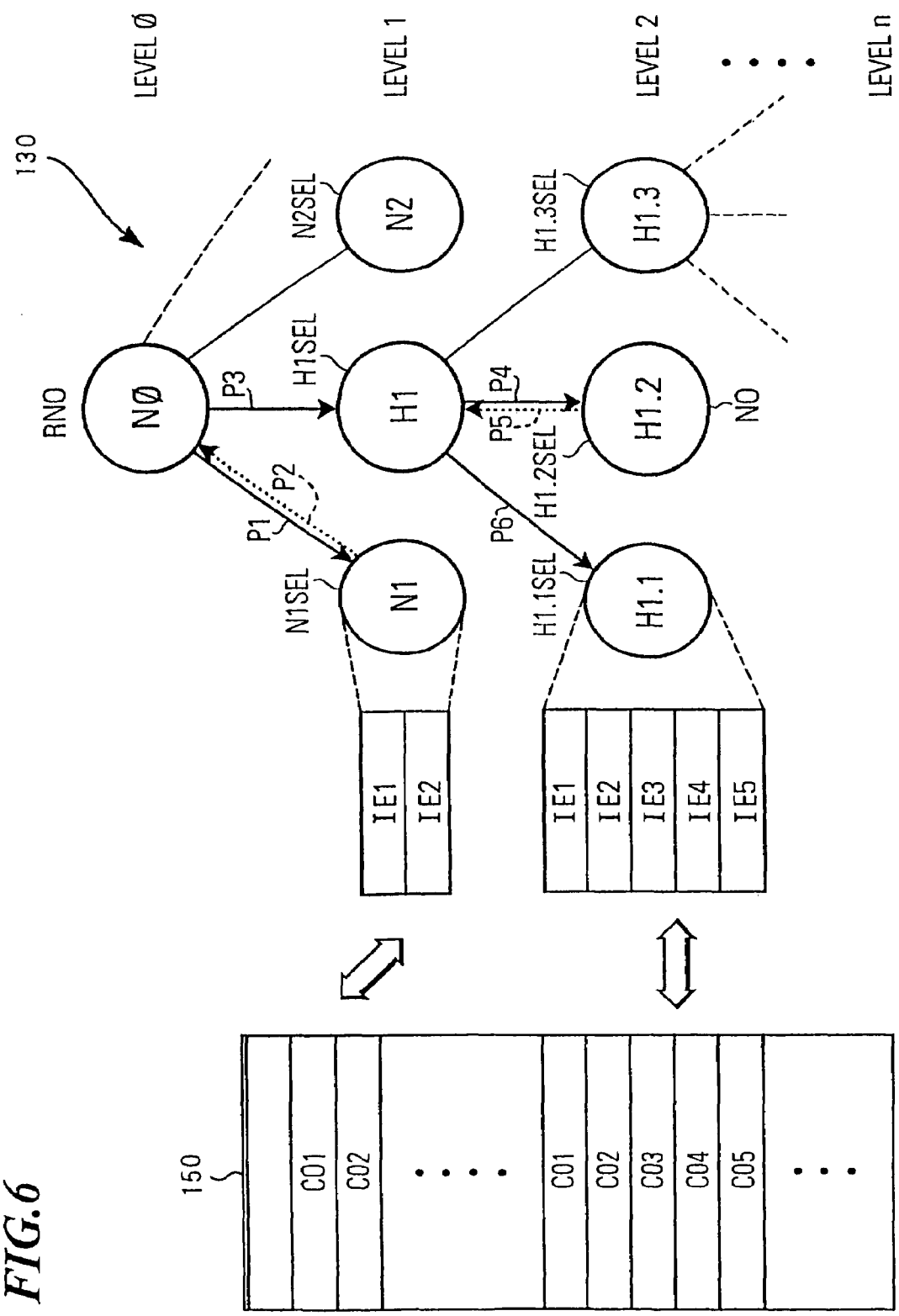

In particular, FIG. 6 shows details of the instruction format configuration file. In particular, the configuration file contains a tree data structure TRE (130) consisting of a plurality of instruction format nodes N0, N1, N2,; H1, H1,1, H1.2, H1.3. Each instruction node N0 indicates a particular combination of instruction elements IE1, IE2; IE1, IE2, IE3, IE4, IE5 associated with each node. Furthermore, each node has associated with it a node selection criterion N1SEL, H1SEL, N2SEL, H1.1SEL, H1.2SEL, H1.3SEL. The top node N0 which is the entry node into the tree structure (TRE) 130 provides a default instruction format, i.e., also the entry node N0 has associated with it a number of instruction elements, however, since this is the node where the search procedure is started, there is no need to assign to it a special selection criterion, because it is always selected.

As shown with the double-arrow in FIG. 6, each instruction element IE is associated with a corresponding instruction element generating unit CO in the instruction format set up of program 103.

In step S7, as shown in FIG. 7b, the program 103 searches the tree data structure (TRE) 130 with the determined content data request properties and it selects an instruction format node H1.1 whose associated node selection condition H1.1SEL matches the determined content data request properties.

In accordance with one embodiment consistent with the present invention, the program 103 provides all the properties before the actual searching operation in step S7, namely with the steps S3, S4, S5 and S6 before the actual search operation starts.

In accordance with another embodiment consistent with the present invention, the program 103 sequentially goes from node to node (as will explained below with more detail) and will at each node look at its selection criterion N1SEL, N2SEL . . . , and only when performing the special test as to whether or not the criterion is fulfilled, it will ask or inquire regarding providing a certain property of interest which needs to be compared with one of the properties requested in the selection criterion.

In the latter embodiment consistent with the present invention, the program 103 will on request provide the properties such that processing time and memory space can be saved since there is no requirement to always keep all properties that could possibly be of interest in the memories.

After finding the appropriate node and by doing so also finding the appropriate instruction element generating applications CO relating to the indicated instruction elements, in step S8 shown in FIG. 7b, the program 103 prepares the instruction data set (IDS) 150 by executing the instruction element generating applications CO of the selected instruction format node N0. Thus, after step S8 the complete instruction data set 150 has been flexibly set up by unit of only executing generation applications CO, which have been found on the basis of the properties of the content data request, i.e., on the basis of searching the tree with the properties to find a matching criterion in one of the nodes.

Figure 3:
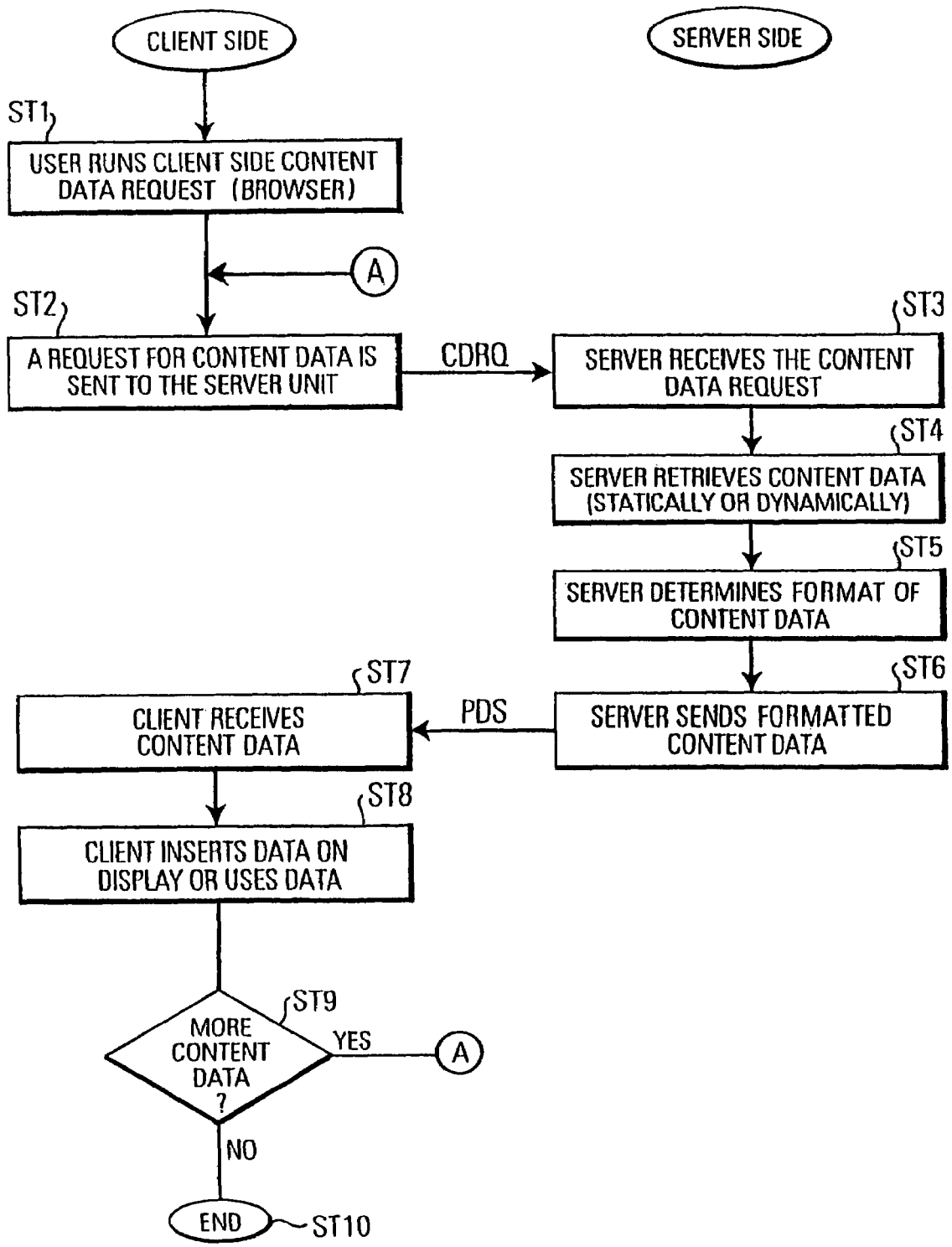
FIG. 3 depicts a flowchart of a client and server system consistent with FIG. 1.

Therefore, this generated instruction data set 150 can now be sent from the server 100 to the client 200 by the program 103 in step S9, S10 (corresponding to the steps ST6, ST7 in FIG. 3) and the user can display or use the instruction data set (IDS) 150 in the operation and if more content data is requested (YES) in step S12, the procedure is started anew with step S2 in FIG. 7a (steps S10, S11, S12 correspond to the steps ST7, ST8, ST9 in FIG. 3). If no more content data needs to be requested the communication link 110 is closed in step S13 (corresponding to step ST10 in FIG. 3).

Figure 8B:
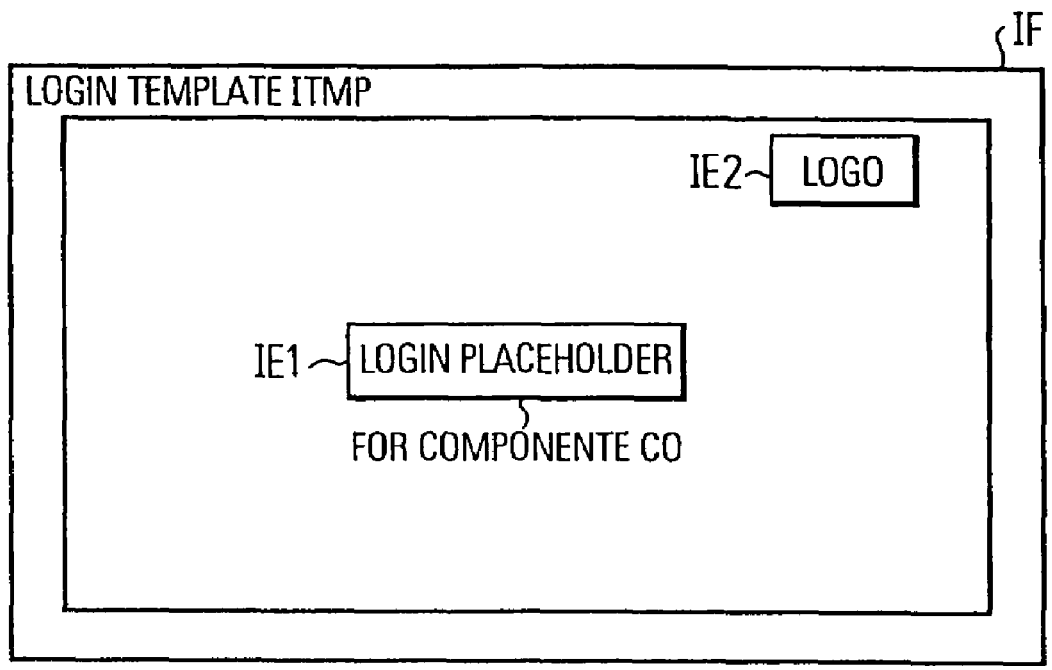
Figure 8B:
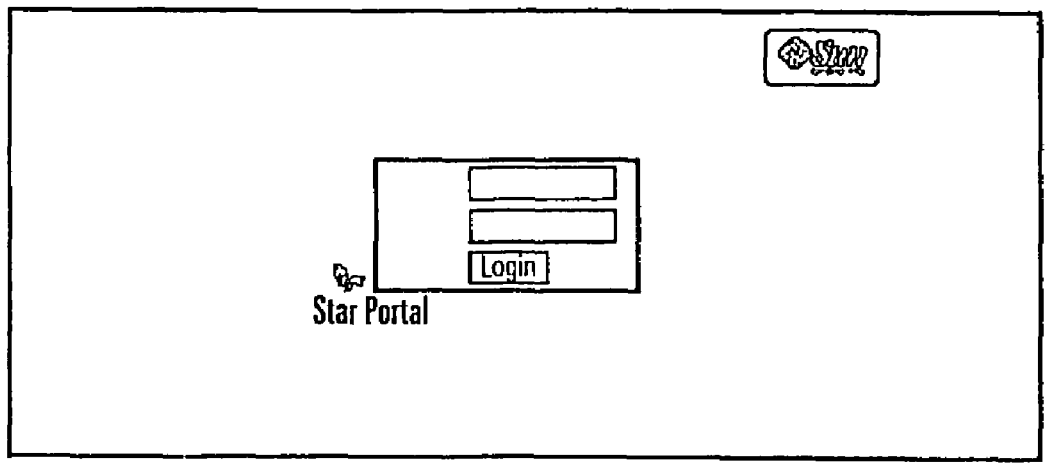
Figure 8C:
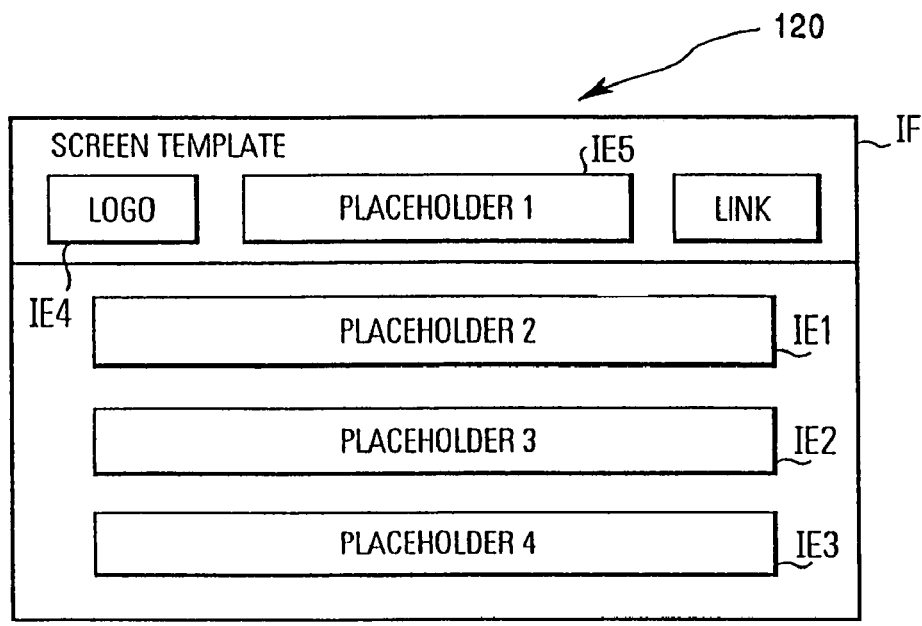
FIG. 8c depicts a portion of the client and server system in accordance with an embodiment consistent with the present invention.
Figure 8C:
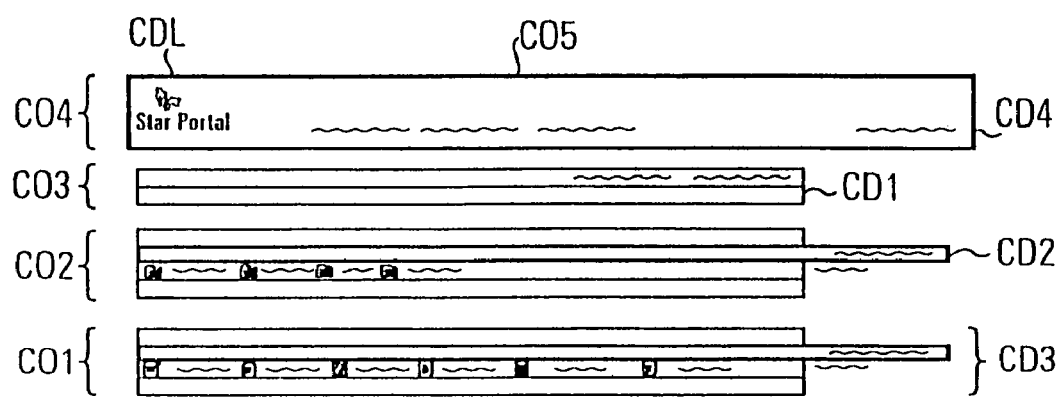

The examples in FIG. 8b, 8c related to the case where, for example, the node N1 and the node H1.1 were selected in the selection procedure shown in FIG. 6.

Figure 4:
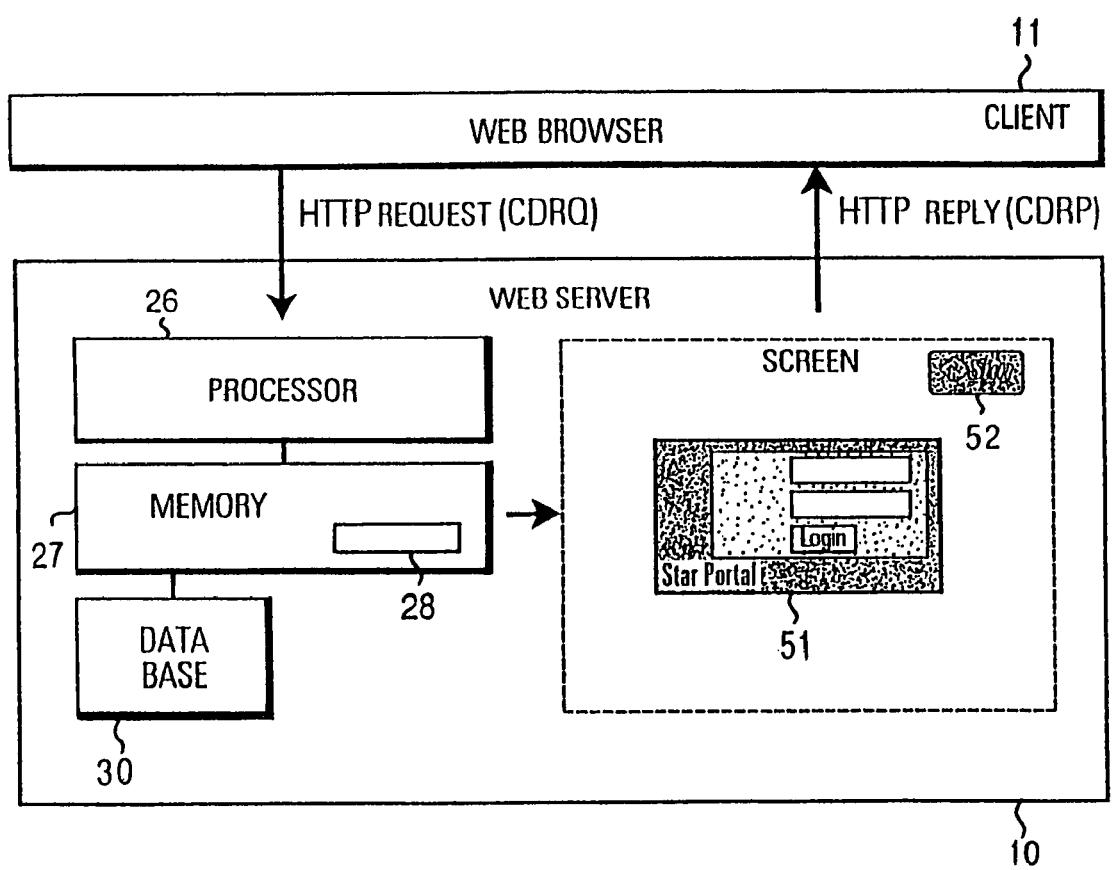
FIG. 4 depicts a portion of a data processing system in a client and server system consistent with FIG. 1.

As will be noted from FIG. 8b, the lower diagram is similar to the screen diagram shown in FIG. 4. However, it has been differently set up via the flexible screen or instruction format adaption by the screen/instruction registry of the program 103 as explained above with the selection procedure in FIGS. 6 and 7b. That is, whilst in FIG. 4 the screen format IF or the format of the data set was fixed and completely independent of the properties, the screen format (IF) shown in FIG. 5b was selected by specially searching for the node N1 with properties which match the selection criterion N1SEL. For example, the instruction element generating applications CO1, CO2 could be responsible for generating the log-in window and the logo shown in the lower half of FIG. 8b. The upper half in FIG. 5b shows the logical generation of this adaptive screen format (IF). Therefore, whilst the screens in FIG. 8b and FIG. 4 look very similar, they have been generated on the basis of different procedures. In particular, the screen in FIG. 8b was generated by the program 103 being executed at a specially selected node N1.

Likewise, the example in FIG. 8c could be an example for arriving at the node H1.1 in FIG. 6. As shown in FIG. 6, if the selection criterion H1.1SEL is fulfilled, then the instruction element generation applications CO1, CO2, CO3, CO4, CO5 are executed for forming the editing screen shown in the lower half of FIG. 8c. The upper half in FIG. 8c again shows the instruction data set having the particular format IF together with the instruction elements IE1, IE2, IE3, IE4, IE5.

As will now be apparent from the above description, the screens obtained, for example, in FIGS. 8b and 8c have been generated flexibly, namely dependent on the properties which match a particular selection criterion of a node in the tree structure (TRE) 130. Another embodiment consistent with the present invention, where not only the instruction element generation applications CO are determined in the tree structure (TRE) 130 but also the positions are determined into which the instruction element generation applications CO will insert their data will be described further below.

The tree structure of nodes can, in accordance with one embodiment consistent with the present invention, already be stored permanently in the configuration file, to be used commonly for all clients whenever they send a content data request message with appropriate parameters allowing i.e., the property determination.

In accordance with another embodiment consistent with the present invention, it is possible to set a new tree structure, i.e., when a new request message is received in the server 100. This new tree structure is then used either only for the client 200 which issued the request or for all clients.

In accordance with yet another embodiment consistent with the present invention, it is also possible that the tree structure is flexibly set, i.e., set in accordance with the determined properties. Thus, one of more appropriate tree structures can be loaded into the processor (i.e. one of several XML files containing such a tree structure).

Furthermore, in accordance with yet another embodiment consistent with the present invention, it is also possible that there is a cross-connection or cross-link between several pre-stored tree structures. In this case, for example, if the procedure finds a valid node, i.e., a node whose selection condition is fulfilled by the enquired and provided properties, then a switch could be made from this node (called a tree switch node) to a node of another different tree structure whose nodes are subsequently searched. It is also possible, during the tree search procedure, to jump back and forth between two or more available tree structures.

Next, we will first describe a more particular embodiment how the procedure runs through the tree structure (TRE) 130 in order to find the appropriate node.

e. Finding an Appropriate Child Node

Figure 9:
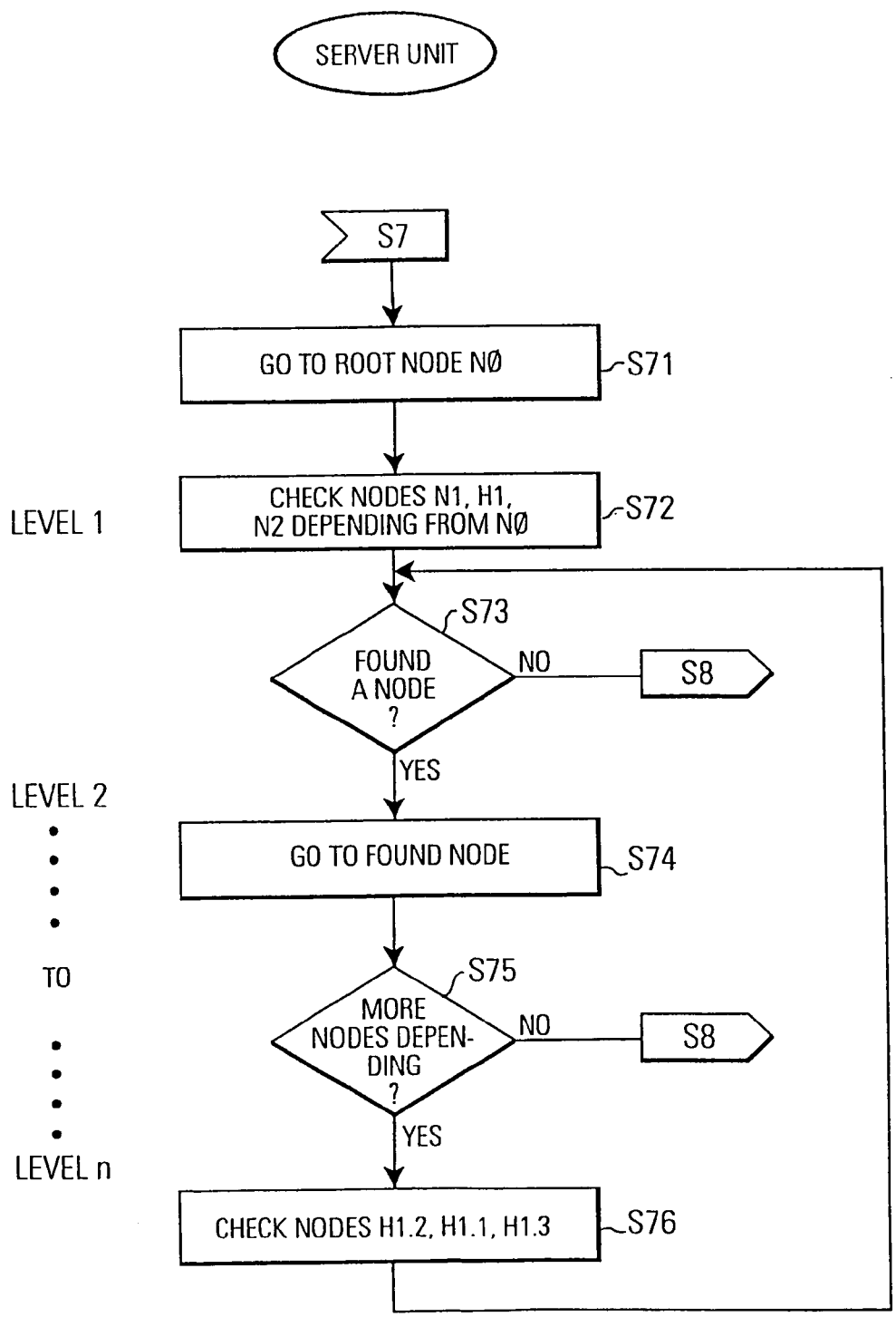
FIG. 9 depicts a flowchart consistent with the embodiment of FIG. 7b.

Hereinafter, the selection procedure P1, P2, P3, P4, P5, P6 executed in the step S7 in FIG. 7b will be explained with more detail in FIG. 9.

In step S71, the program 103 starts the search at the root instruction format node RNO. In step S72 the program 103 checks all nodes N1, H1, N2 ... depending from the root node NO. As shown in FIG. 6, the currently available content data request properties failed to match the criterion N1SEL of the node N1 and therefore, the procedure next checks the selection criterion H1SEL of the next depending node H1 (see the processing flow P1, P2, P3). When checking all the nodes N1, H1, N2 in step S72, the program 103 requests for the current contents data request CDRQ a property relating to a property name parameter NME (explained with more details below) or a node selection condition of the respective next node.

If no node with a matching criterion is found in step S73, then the procedure goes to step S8 in FIG. 7b. In Step S8, the respective generation applications CO associated with the root node RNO are executed by the program 103 because, although the root node RNO has not associated with it a selection criterion, it also is associated with some instruction elements IE and thus with some instruction element generation applications CO. As will be understood below, the root node can produce a default instruction format with an instruction template in the plurality of instruction element positions into which the instruction element generating applications CO can insert instruction element data sets when they have been executed.

Returning to FIG. 9, if a matching criterion, i.e., a next valid node, is found by the program 103 in step S73, the procedure goes to step S74 where the next node with the matching criterion H1 is approached. In step S75, the program 103 tests whether the node A1 is a child node, i.e., whether there are any further nodes depending from it or not. If there are no further nodes depending (NO in the operation S75), then the instruction element generation applications CO associated with the instruction elements IE of the child node H1 are executed by the program 103 in step S8.

If there are still more nodes depending from the node H1, as is the case in FIG. 6, then the program 103 checks further dependent nodes H1.2, H1.2, H1.3 in step S76. Then again, the program 103 in step S73, checks to find whether a matching node is found. As shown in FIG. 6, the loop of steps S73, S74, S75, S76 is carried out once more (paths P4, P5, P6; the dotted line always indicates when no match was found at the respective depending node). Thus, the program 103 selects the node H1.1. in level 2, because it is a child node (no further depending nodes) and the selection criteria was matched by the provided properties.

Depending on the depth of the tree, up to n iterations in the loop may have to be carried out by the program 103 until a valid child node is found.

f. Inheriting Features from a Previous Node

Above it was described that in a case where no further depending nodes are detected and the selection criterion is fulfilled, a screen or instruction format will be set up with the corresponding generation applications. In this case, the generation applications are those generation applications belonging to the node, which have been found with a matching criterion. That is, the instruction format and thus the instruction data set will be fully generated by the generation applications belonging to this particular node.

However, in accordance with another embodiment consistent with the present invention, a depending node may also inherit some of the instruction element or instruction element generation applications from a previous node through which the selection procedure ran.

Such an inheritance function is particularly advantageous for embodiments consistent with the present invention in which the instruction format is composed of two parts, namely of an instruction template 120 and a plurality of instruction element positions IEP into which the respective instruction element generating applications CO insert instruction element data sets which in combination form the instruction data set (IDS) 150. The purpose of such a two-part division of the instruction format (IF) may easily be understood with reference to the example in FIG. 8c.

That is, in FIG. 8c, a first set of instruction elements may merely be responsible for forming a so-called instruction template (as also shown in FIG. 8b). As explained, this instruction template 120 will again be generated by one or more associated instruction element generating applications of the program 103, i.e., these generation applications of the program 103 will set up a template with a number of placeholders IE1, IE2, IE3, IE4 which define the positions where later on further instruction element generating applications will insert content data retrieved from the data base 105.

The difference between the template part and the second part, which inserts the data, can be understood with an example. For instance, the template 120 shown in FIG. 8c may set up the positions where in principle yellow (IE1), green (IE2) and red (IE3) cards will be placed. The template only specifies the principal positions where they should be located. Now, in a second part an actual yellow, green and red card is placed by the program 103 in the instruction or screen elements IE1, IE2, IE3, for example by an appropriate instruction element generation unit relating to yellow, red and green cards. That is, in a second part the instruction element generation applications will insert the respective "yellow", "red" and "green" data.

On the basis of understanding the division into an instruction template and an element data insertion at the placeholders (provided by the template), the function of inheritance can easily be understood. Of course, the root node RN0 in FIG. 6 has a default screen or instruction template into which instruction elements of the same root node will insert data if no further depending valid nodes are detected (NO in the operation S73).

On the other hand, the node N2 in FIG. 6, which is a child node, may not contain a screen template but only some instruction element generation unit to be used in connection with the node N2. In this case, the template would be missing and the instruction element generation applications would not know at which position to insert their data. Therefore, the node N2 inherits the screen or instruction template from the root node NO if it itself cannot provide such a template.

As another example, the selected child node H1.1 may not have an instruction template specification but the previous node H1 one level up contains such a template specification. As mentioned before, the only reason why the node H1 was not selected is because there where further dependency nodes. On the other hand, the selection criterion was indeed fulfilled with the currently available property. Therefore, in case a screen template or instruction template is missing at a valid child node, the selection procedure of the program 103 runs back through all previous valid nodes until it finds a valid node (i.e., a node with a matching criterion) which contains the necessary screen or instruction template. For example, it may be the case that also the node H1 has itself no template specification such that in this case the default template specification of the node N0, which will always be valid, is used. Thus, the screen template "further up the tree" is passed on/to (inherited by) nodes "further down the tree."

According to another embodiment consistent with the present invention, it is indeed envisaged that the set up of an instruction format is not limited to a first part of a template and a second part of inserting the data at the template placeholder positions. It could be imagined that an instruction format or screen format consists of a large number of different parts and also in this case a part specified in a previous node, which has been detected as valid can be inherited downwards to any child node.

In accordance with another embodiment consistent with the present invention, it is of course also possible that several parts or specifications are inherited downwards to a child node. Thus, the inheritance procedure has a particular advantage that it is not necessary to perform all specifications in all nodes because specifications from higher nodes upwards can be taken over (inherited) at lower nodes.

Speaking about the division of the instruction format in an instruction template and a plurality of instruction element positions, in accordance with one embodiment consistent with the present invention, when the instruction data set is a set of instruction data for displaying a screen with a particular screen layout format on the client unit display unit 205, the instruction template 120 is a screen layout template and the instruction element positions are placeholders on the screen into which the respective instruction element generating applications insert screen element data sets when they are executed.

Alternatively, in accordance with another embodiment consistent with the present invention, when the instruction data set (IDS) 150 relates to a set of instructions for controlling a device with a particular control command layout on the client 200, for example a robot, the instruction template 120 is a command layout template and the instruction element positions are command holders, into which the instruction element generating applications insert command data sets when they are executed.

Figure 10A:
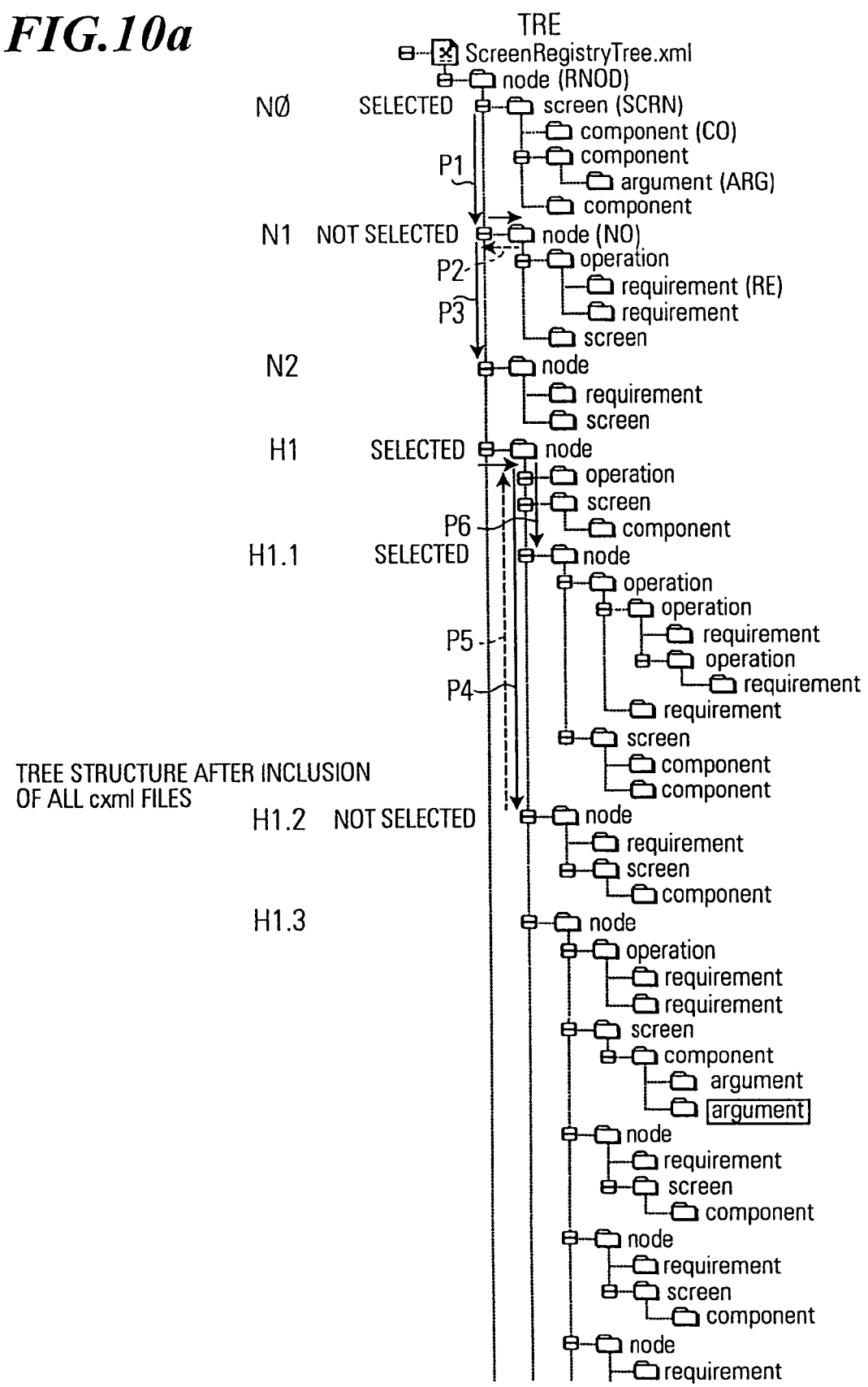
FIG. 10a depicts a tree structure in accordance with one embodiment consistent with the present invention.

Therefore, it should be understood that the concept of a template and the position holders is not restricted to data sets which use graphics data but can by used for any other data sets, which the user wants to use at the client unit for other purposes, such as control purposes, printing purposes etc.

g. Screen Template/Selection Criterion/Generation Applications Java Implementation Hereinafter, with reference to FIG. 10*a* and FIG. 10*b* another embodiment consistent with the present invention is described in which the selection unit and the screen registry are implemented as XML files in JAVA. However, it should be noted that the usage of the screens, components, arguments, requirements and substitutions explained below are not restricted to an implementation in JAVA and corresponding functions can be found in other implementations. Therefore, the JAVA implementation below only serves as a good example for illustrating some further features and functions of further embodiments. In FIGS. 10*a*, 10*b* the same designation of nodes, selection criteria and instruction element generation applications as in FIG. 6 are used. A thick line in FIG. 10*a* illustrates a possible search scenario, similar to the path P1, . . . , P6 in FIG. 6.

As shown in FIG. 10*a*, the tree data structure comprises a plurality of nodes NO, for example the nodes N0, N1, N2; H1, H1.1, H1.2, H1.3 which are arranged in a tree structure, i.e., from the node NO the nodes N1, N2, H1 are branched off and in turn the nodes H1.1, H1.2, H1.3 are branched off from the node H1. In this respect, the tree structure is similar to the one shown in FIG. 6.

Furthermore, the tree structure comprises screens SCRN, components CO, arguments ARG and possibly substitutions SUB (a substitution is, however, not shown in FIG. 10*a* because it is not needed here).

As will be understood with reference to FIG. 10*b*, showing a JAVA implementation of the instruction format selection unit, a screen is basically the definition of the screen (instruction) template. As can be seen from FIG. 10*b*, the root node RNOD defines a default screen with a JAVA server pages program "HTMLTemplate.jsp". Thereafter, there are two component names "title" and "background", which essentially correspond to instruction element generating applications CO used for building up the elements (placeholders) of the screen template. As mentioned above, a template is to be understood as providing a format together with instruction element positions (placeholders) into which other instruction element generating applications can then insert their data.

The two component names are followed by an argument name "picture". Like normal arguments in any programming language, a value of this argument "$BACKGROUND_PICTURE" is still undefined at this stage. When the actual screen template is executed, this value is set with a subprogram request via a substitution name, which is shown in FIG. 10*d* at the bottom.

Furthermore, the screen template includes a further component with a component name "error", wherein a program "/html/HTMLError.jsp" is executed by the program 103 when there is an error in the default screen template. As can be seen from comparing the code section for the node N0 in FIG. 10*b* with the tree structure in FIG. 10*a*, the actual root node RNOD is defined by a screen, two components (wherein the second component has also an argument) and another component. The inclusion of the undefined argument is made by referring to a substitution component "$BACKGROUND_PICTURE", which is located at the node H1.3. As will be appreciated from FIG. 10*a* and FIG. 10*b*, the root node N0 is the entry node into the tree structure (TRE) 147 and therefore, there is no selection condition specified, i.e., there are no requirement types, which define these selection conditions.

Proceeding to node N1, this node includes, as shown in FIG. 10*a*, an operation, two requirements and a screen. As can be seen from FIG. 10*b*, an operation is basically a logical combination of some sub-conditions, which are defined with the requirement type. Thus, the first requirement comprises a property type parameter "requestParameter" and further includes a name "cmd". This property type parameter RE-TYP indicates to the program 103 the type of property to be enquired. It should be noted that this is not the property itself but only the type of property, which is looked for. The actual property, which is inquired, is the "CMD" (i.e., a command). The expected value of the inquired property of the type "requestParameter" is "execute_login". The next requirement checks for the type "executionEnvironment" the response for the name "loginBean". The expected value should be "0". Furthermore, the operation type, i.e. an operation condition, is specified for logically "AND" combining the results of the two requirements. Therefore, the node N1 will be selected if the "cmd" is equal to "execute_login" and the "loginBean" is equal "0".

Furthermore, in this case the node N1 also defines a screen template which is here called "/portal/login" of the class "login". For example, this screen template could produce a login page as shown in FIG. 8*b*. As explained above, since the node N1 also includes a screen template, it will not "inherit" the default screen template of the node N0.

Furthermore, the node N2, which is also depending from the root node RNOD includes one requirement and a screen. That is, also the node N2 is associated with a selection condition which checks for name "cmd" to be having a value of "logout". If the node N2 is selected, yet another screen template (here relating to a logout screen) is selected. Therefore, if the node N2 is selected, because the return parameter from the property provider is "logout", then also the node N2 will define its own screen template and will not inherit a screen template from a node further above.

The node definition with its selection condition (requirement), template definition (screen template), logical combinations for the selection conditions (operation) and indications of instruction element generation applications (components) can, in accordance with one embodiment of the invention, be implemented as XML files with a JAVA code or JAVA implemented code as shown in FIG. 10b for the main nodes N0, N1, N2.

Figure 10C:
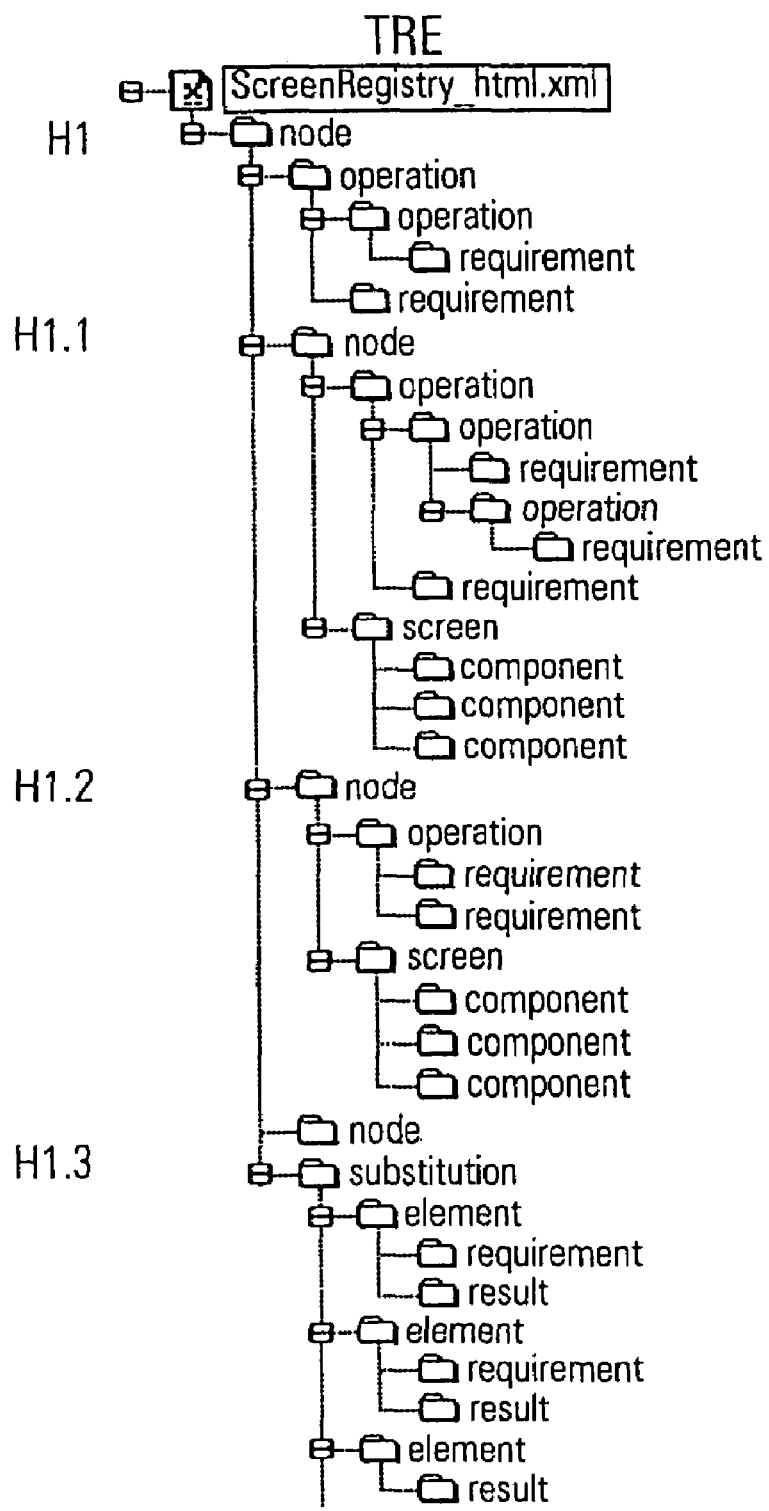

FIG. 10c and FIG. 10d show the definition of HTML nodes H1, H1.1, H1.2, H1.3. The definitions for these nodes in FIG. 10d, 10e are in the same format as the definition in FIG. 10b for the main nodes. For example, the node H1 comprises operations and requirements but it does not comprise a screen template. The node H1.1 includes a screen template "/html/HTMLLoginTimplate.jsp" and other components and requirements as shown in FIG. 10c and FIG. 10d. The node H1 and the node H1.1 will be selected if the correct properties are returned from the property provider, whenever a requirement type execution operation is to be checked within the respective nodes.

In node H1.3 a special substitution name is included, i.e. this node H1.3 provides the subprogram for an inclusion of a file in the node N0. Thus, the argument type in the node N0 can have cross-reference to the substitution name in the node H1.3. For example, in the node H1.3 a special background is set for the screen.

Among the nodes H1, H1.1, H1.2, H1.3 only the nodes H1.1 and H1.2 have a screen template definition. Therefore, should these nodes be selected during the selection procedure going through the tree structure, then these nodes will not inherit a screen template from one of the preceding valid nodes (valid=the selection condition was fulfilled but there where further child nodes to this node).

Figure 10F:
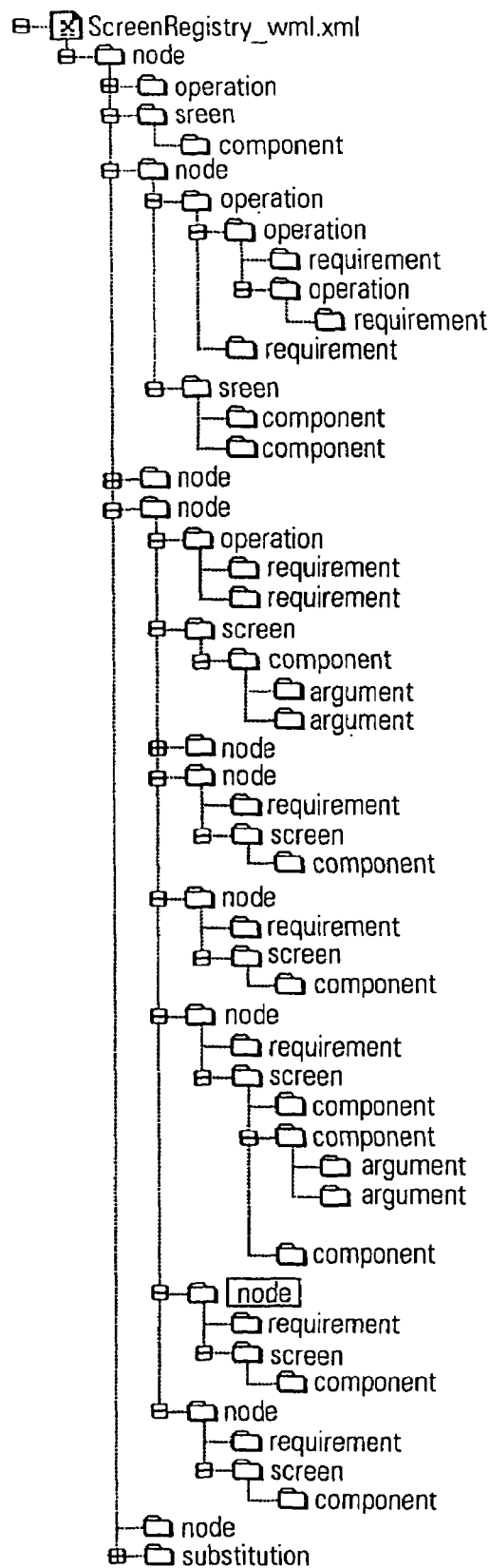

Finally, FIG. 10f shows a tree structure for WML nodes and FIGS. 10g-i show the content of the information or instruction format selection unit IFSEL in the WML case. The structure of this tree is in principle similar to the structure of the four described trees, such that no further discussion is necessary here. All files for the screen registry (a tree data structure) definition can be implemented, in accordance with one embodiment of the invention, by XML files, as the skilled person will easily realize from the JAVA code in FIG. 10b, FIG. 10d and FIG. 1e.

The instruction format selection unit can, according to one example in FIG. 10a, carry out a search procedure as the one shown in FIG. 6, namely along the search paths P1, P2, P3, P4, P5, P6 in order to select the node H1.1. If the node H1.1 is selected because the requirement types are fulfilled, then this node happened to include its own screen template "login.screen" and therefore in this search procedure, the screen of the last above node is selected. In principle, the selection procedure will run through the nodes in a hierarchical order from level to level. However, it is of course possible that after checking the node H1, not the node H1.2 is first checked but the node H1.1. A skilled person can, on the basis of the above teachings, derive many different search scenarios by running through the tree structure in order to find a valid node.

Once the valid node has been found, the component types will indicate a respective instruction element generating unit and the component is executed by the program 103 in order to fill the placeholders defined with the screen template with the respective data. Thus, once a node has been selected, the specific components generate the final instruction data set to be returned to the client 110.

Therefore, it can now be understood that with the flexible set up of the tree structure in the configuration file, any type of flexible set up, for example for a screen, can be performed, essentially based on the idea of forming the screen registry as shown in FIG. 10a. The screen registry reads its data from an XML file or the configuration and obtains a tree of nodes with their requirements (conditions). Thus, each node refers to a possible screen and a screen is formed by a template jsp or a servlet with a set of argument servlets, as shown in FIG. 10b. The template describes at what positions (placeholders) the arguments are inserted in the template in the process of creating the response. The requirements describe in terms of client capabilities, the URL, request parameters etc., i.e., the above-described properties, which node to use for which request.

Therefore, the present invention can adaptively and flexibly create instruction formats, i.e., for the set up of a screen or the set up of an instruction data set, dependent on some properties derived from the content data request sent by the client unit. Thus, the actual servlets or jsps do not have to be touched and still a flexible way of setting up the instruction formats can be achieved.

h. Software/Hardware Embodiments

Hereinafter, embodiments consistent with the present invention will be described with reference to the drawings. Whilst hereinafter often reference is made to special message exchanges between a client 200 and a server 100 in an Internet application example where web-pages are retrieved from a server unit in a JAVA-environment, it should be understood that the invention is not limited to the special JAVA data communication implementation.

Methods and systems consistent with the present invention can be applied to any client/server scenario, independent of the type of client and server implementation used. Furthermore, hereinafter reference is often made to the case where a special screen layout is adaptively prepared as said instruction format. However, methods and systems consistent with the present invention are not restricted to setting up a screen layout, and any other instruction format including command instructions or the like can be used.

Furthermore, the features in the processing operations of the above-described embodiments consistent with the present invention may be realized by dedicated hardware or may be realized as programs including code instructions executed on data processing units. It is further possible that parts of the above processing operations are carried out in hardware, whereas other processing operations are carried out using software.

It is further noted that a computer program produced stored on a computer readable storage medium can comprise code units adapted to carry out on a server side or on the client side respectively the operations described above. Further, a computer program product may be provided comprising the computer readable medium.

Furthermore, the client 200 may be not only a computer, but according to another embodiment consistent with the present invention, it can be a general purpose data processing device, a mobile device such as a mobile telephone such as one, which is WAP compatible or a mobile organizer, a navigation device or a cash point.

h. Further Embodiments (Code Sections)

According to other embodiments consistent with the present invention, a server 100 may be constituted as follows:

1) A server 100 of a data processing system in which one or more clients are provided by the server 100 with an instruction data set in a particular instruction format in response to a content data request, include:

a) a content data request property provider code section for providing one or more content data request properties of the content data request made by a client 110;

b) an instruction format set up code section for preparing an instruction data set having the instruction format and consisting of a plurality of instruction element data sets each representing a particular instruction element of the instruction format and generated by one or more instruction element generating code sections of said instruction format set up code section;

c) an instruction format configuration file containing a tree data structure consisting of a plurality of instruction format nodes, each instruction format node indicating a particular combination of instruction elements constituting a particular instruction format and having associated with it a node selection criterion;

d) an instruction format selection code section for searching said tree data structure with the determined content data request properties and for selecting an instruction format node whose associated node selection condition matches said determined content data request properties; and e) said instruction format set up code section preparing the instruction data set to be sent to the client 200 by executing the instruction element generating code sections of the selected instruction format node.

2) A server according to item 1, wherein the content data request property provider code section analyses the content data request to provide one or more of client unit related properties and content data related properties.

3) A server according to item 2, wherein the content data request property provider code section includes:

a device property provider for providing for each client as the client-related properties device properties about the client device;

a resource property provider for providing as the content data related properties resource properties about data content resources providing the content data;

a content data requesting code section property provider for providing as the client-related properties, properties about the content data requesting code section used at the clients; and a command property provider for providing as said client-related properties, properties about commands issued at the clients.

4) A server according to item 2, wherein the content data request property provider code section includes a first property memory for client-related properties and a second memory for content data related properties.

5) A server according to item 4, wherein the content data request property provider code section analyzes a first content data request to obtain the client-related properties and the content data-related properties, wherein at the arrival of any subsequent content data request in the same session the content data request property provider only accesses the first memory or the second memory to provide the client-related properties and/or the content data-related properties.

6) A server according to item 1, wherein the node selection condition includes one or more node selection requirements including at least one property name parameter and an expected property; wherein the instruction format selection code section is adapted for starting the search at the root instruction format node; wherein the instruction format selection code section is adapted for requesting from the property provider code section for the current content data request a property relating to the property name parameter of a node selection condition of a next instruction format node; wherein the instruction format selection code section is adapted for branching to the next instruction format node, if the provided property match with the expected property.

7) A server according to item 6, wherein the node selection requirement further includes a property type parameter indicating the type of property to be enquired at the property provider.

8) A server according to item 6, wherein the node selection condition further includes one or more operation conditions for logically combining the results of two or more requirements.

9) A server according to item 1, wherein the instruction format formed by the instruction elements of a root instruction format node of the tree data structure is a default instruction format.

10) A server according to item 9, wherein the default instruction format is an instruction format with an instruction template and a plurality of instruction element positions into which the instruction element generating code sections insert instruction element data sets when they are executed.

11) A server according to item 1, wherein the instruction format includes an instruction template and a plurality of instruction element positions into which the instruction element generating code sections insert instruction element data sets when they are executed.

12) A server according to item 1, wherein the instruction element generating code sections include a component name of a component to be executed.

13) A server according to item 12, wherein the instruction element generating code sections further include an argument name with a substitution name of a substitution component located at a different node.

14) A server according to item 11, wherein the instruction data set is a set of instruction data for displaying a screen with a particular screen layout format on the client, wherein the instruction template is a screen layout template and the instruction element positions are place holders into which the instruction element generating code sections (CO1-CO5) insert screen element data sets when they are executed.

15) A server according to item 11, wherein the instruction data set is a set of instruction data for controlling a device with a particular control command layout format on the client, wherein the instruction template is a command layout template and the instruction element positions are command holders into which the instruction element generating code sections insert command data sets when they are executed.

16) A server according to item 1, wherein the client and the server are JAVA based code sections, wherein the instruction format configuration file containing the tree data structure is an XML file.

17) A server according to item 17, wherein the instruction element generating code section is a JAVA servlet or a JAVA server pages program.

18) A data carrier for a server side having computer readable storage code embodied therein which includes:

a) a code section for providing one or more content data request properties of the content data request made by a client;

b) a code section for preparing an instruction data set having the instruction format and consisting of a plurality of instruction element data sets each representing a particular instruction element of the instruction format and generated by one or more instruction element generating code sections of said code section for preparing an instruction data set;

c) a code section containing a tree data structure including a plurality of instruction format nodes, each instruction format node indicating a particular combination of instruction elements constituting a particular instruction format and having associated with it a node selection criterion;

d) a code section for searching the tree data structure with the determined content data request properties and for selecting an instruction format node whose associated node selection condition matches said determined content data request properties; and e) said code section for preparing an instruction data set being adapted for preparing the instruction data set to be sent to the client unit executing the instruction element generating code sections of the selected instruction format node.

19) A data communication system including one or more server units according to one or more of items 1-17 and one or more clients.

20) A server unit of a data processing system in which one or more clients are provided by the server with an instruction data set in a particular instruction format in response to a content data request, including:

a) an instruction format configuration file containing a tree data structure consisting of a plurality of instruction format nodes, each instruction format node indicating a particular combination of instruction elements constituting a particular instruction format and having associated with it a node selection criterion; and b) an instruction format selection code section for searching said tree data structure with content data request properties relating to a content data request sent by the client and for selecting an instruction format node whose associated node selection condition matches said content data request properties.

21) A server of a data processing system in which one or more clients are provided by the server with an instruction data set in a particular instruction format, wherein the server is adapted to make the instruction format of the instruction data set flexibly dependent on the capabilities of the client and/or the properties of the content data.

22) A server of a data processing system in which one or more clients are provided by the server with an instruction data set in a particular instruction format, wherein the server is adapted to make the generation and retrieval of the content data and its format flexibly dependent on properties of the client and/or the properties of resource code sections which provide the content data.

23) A server according to item 22, wherein the server includes, for the flexible generation and retrieval of the content data, a selection code section adapted to select from a number of instruction format templates a particular instruction format template dependent on client properties and/or resource properties, wherein the template describes at what places in the instruction data set particular instruction elements can be placed; and one or more instruction element generating code sections adapted for inserting content data in the places indicated in the instruction format template;

wherein the selection code section also selects the one or more instruction element generating code sections in accordance with the client capabilities or resource capabilities, from several available instruction element generating code sections.

24) A server of a data processing system in which one or more clients are provided by the server with an instruction data set in a particular instruction format, wherein the server includes:

a selection code section adapted to select from a number of instruction format templates a particular instruction format template dependent on client properties and/or resource properties, wherein said template describes at what places in the instruction data set particular instruction elements can be placed; and one or more instruction element generating code sections adapted for inserting content data in the places indicated in the instruction format template;

wherein the selection code section also selects the one or more instruction element generating code sections in accordance with the client capabilities or resource capabilities, from several available instruction element generating code sections.

25) A server of a data processing system in which one or more clients are provided by the server with an instruction data set in a particular instruction format, wherein the server is adapted to make the instruction format of the instruction data set flexibly dependent on the properties of the client and/or the properties of the requested content data obtained by a content data request property provider code section which is adapted to analyse a content data request from the client to provide said one or more client-related properties and content data related properties.

26) A server of a data processing system in which one or more clients are provided by the server with an instruction data set in a particular instruction format, wherein the server is adapted to make the instruction format of the instruction data set flexibly dependent on client related properties stored in a first property memory and/or content data related properties stored in a second memory.

27) A server of a data processing system in which one or more clients are provided by the server with an instruction data set, wherein the server is adapted to make the provision of the instruction data set dependent on searching a tree structure in a configuration file with some client-related and/or content data related properties, wherein each node in the tree structure generates the instruction data set in a different instruction format.

28) A server of a data processing system in which one or more clients are provided by the server with an instruction data set, wherein the server is adapted to make the provision of the instruction data set dependent on searching a tree structure in an XML configuration file with some client-related and/or content data related properties, wherein each node in the tree structure generates the instruction data set in a different instruction format with a screen template generated by a template JSP (JAVA Server pages) or a servlet with a set of argument servlets and describing at what positions the arguments are to be inserted in the template.

29) A server according to item 27, wherein the tree structure is generated separately for each session between the client and the server.

30) A server according to item 27, wherein the tree structure is generated once and independently for each session between the client and the server.

31) A server according to item 27, wherein the tree structure is generated dependent on client-related properties and/or content data properties.

32) A server of a data processing system in which one or more clients are provided by the server with an instruction data set, wherein the server is adapted to determine client-related properties and content data related properties by analyzing a content data request form the client.

I. INDUSTRIAL APPLICABILITY

As was explained above, the invention is usable in a data communication system, in which a server and at least one client perform a data communication in order to provide the client with an instruction data set in a flexible manner, in particular dependent on properties, which are derivable from the content data request sent by the client. Although heretofore some references were made to the servers and clients implemented in a JAVA environment, it should be noted that the invention is equally well applicable to any other data communication system, in which a main computer and a sub-computer communicate. The invention is also not restricted to the case, where the client is a computer and the invention can in particular be used in environments, where the client is a mobile telephone such as a WAP compatible mobile telephone.

Furthermore, it should be noted that the present invention is not limited to the specific embodiments described herein and that a skilled person can carry out various modifications and variations on the basis of the teachings herein. In particular, the invention can comprise embodiments, which result from a combination of features and operations, which have been described separately in the claims and in the specification. Therefore, the invention is only defined by the scope of the attached claims.

Having described several embodiments consistent with the present invention in detail, various modifications and improvements will readily occur to those skilled in the art. Such modifications and improvements are intended to be within the spirit and scope of the invention. Accordingly, the foregoing description is by way of example only, and is not intended as limiting.

What is claimed is:

1. A data processing system in a client and server system, the server providing the client with an instruction data set in a specified instruction format in response to a content data request from the client, the system comprising:
    a server computer system comprising:
        a memory including a server program that provides one or more content data request properties of the content data request made by the client, that prepares the instruction data set having the specified instruction format and including a plurality of instruction element data sets each representing a specified instruction element of the instruction format and generated by at least one instruction element generating application in an instruction format set up sequence, that includes an instruction format configuration file containing a tree data structure including a plurality of instruction format nodes, each of the instruction format nodes indicating a particular combination of instruction elements having the specified instruction format and having associated with it a node selection criterion, that searches said tree data structure with said determined content data request properties and selects an instruction format node whose associated node selection condition matches said determined content data request properties, and that prepares the instruction data set to be sent to the client by executing the instruction element generating application of the selected instruction format node and inserting content data in places indicated by the instruction element generating application of the selected instruction format node; and
    a processor that runs said server program.

2. The system according to claim 1, wherein said server program analyzes said content data request to provide one or more of client unit related properties and content data related properties.

3. The system according to claim 2, wherein said server program provides for each client as said client unit related properties, device properties about the client, provides as said content data related properties, resource properties about data content resources providing the content data; provides as said client unit related properties, properties about the content data requesting unit used at the client; and provides as said client unit related properties, properties about commands issued at the client.

4. The system according to claim 2, wherein said memory includes a first property storage area for client unit related properties and a second storage area for content data related properties.

5. The system according to claim 4, wherein said server program analyzes a first content data request to obtain said client unit related properties and said content data related properties, wherein at an arrival of any subsequent content data request in a same session said server program only accesses one of said first storage area and said second storage area to provide said at least one of client unit related properties and said content data related properties.

6. The system according to claim 2, wherein said node selection condition comprises at least one node selection requirement including at least one property name parameter and an expected property;
    wherein said search is started at a root instruction format node;
    wherein a property relating to said property name parameter of said node selection condition of a next instruction format node is requested to be provided for the current data request; and
    wherein when said provided property matches with said expected property, said instruction format selection branches to said next instruction format node.

7. The system according to claim 6, wherein said node selection requirement further comprises a property type parameter indicating a type of property provided.

8. The system according to claim 6, wherein said node selection condition further comprises at least one operation condition for logically combining results of at least two requirements.

9. The system according to claim 1, wherein said instruction format formed by instruction elements of a root instruction format node of said tree data structure is a default instruction format.

10. The system according to claim 9, wherein said default instruction format is an instruction format with an instruction template and a plurality of instruction element positions into which the instruction element generating applications insert instruction element data sets when they are executed.

11. The system according to claim 1, wherein said instruction format includes an instruction template and a plurality of instruction element positions into which said instruction element generating applications insert instruction element data sets when they are executed.

12. The system unit according to claim 1, wherein said instruction element generating application includes a component name of a component to be executed.

13. The system according to claim 12, wherein said instruction element generating application further includes an argument name with a substitution name of a substitution component located at a different node.

14. The system according to claim 11, wherein said instruction data set is a set of instruction data for displaying a screen with a particular screen layout format on the client, wherein said instruction template is a screen layout template and said instruction element positions are place holders into which said insert screen element data sets are inserted by said instruction element generating application when said instruction element generating application is executed.

15. The system according to claim 11, wherein said instruction data set is a set of instruction data for controlling a device with a specified control command layout format on the client, wherein said instruction template is a command layout template and said instruction element positions are command holders into which said instruction element generating application inserts command data sets when said instruction element generating application is executed.

16. The system according to claim 1, wherein the client and the server program are JAVA based applications, and wherein said instruction format configuration file containing said tree data structure is an XML file.

17. The system according to claim 1, wherein said instruction element generating application is one of a JAVA servlet and a JAVA server pages program.

18. The method according to claim 17, wherein said instruction element generating applications is one of a JAVA servlet and a JAVA server pages program.

19. A method in a data processing system for providing in a client and server system, at least one client by a server with an instruction data set in a specified instruction format in response to a content data request, comprising the steps of:
provided at least one content data request properties of a content data request made by a client computer system;
preparing the instruction data set having the specified instruction format at a server computer system, wherein the instruction data set comprises a plurality of instruction element data sets each representing a specified instruction element of the specified instruction format;
searching a tree data structure stored in an instruction format configuration file at a server computer system the tree data structure comprising a plurality of instruction format nodes, each instruction format node indicating a specified combination of instruction elements including the specified instruction format and having associated with it a node selection criterion, with said determined content data request properties and for selecting an instruction format node whose associated node selection condition matches said determined content data request properties; and
preparing the instruction data set to be sent to the client computer system by executing instruction element generating applications of the selected instruction format node and inserting content data in places indicated by the instruction element generating application of the selected instruction format node.

20. The method according to claim 19, further comprising the steps of:
analyzing a first content data request to obtain and store properties in a memory and, at an arrival of a subsequent content data request in a same session, accessing said memory for providing said properties.

21. The method according to claim 19, wherein said node selection condition comprises at least one node selection requirement including at least one property name parameter and an expected property; and further comprising the steps of:
starting a search at a root instruction format node;
requesting from a current content data request a property relating to said property name parameter of a node selection condition of a next instruction format node; and
branching to said next instruction format node if said provided property matches with said expected property.

22. A computer readable medium containing instructions that cause a data processing system to perform a method of providing in a client and server system, at least one client by a server with an instruction data set in a specified instruction format in response to a content data request, the method comprising the steps of:
providing at least one content data request properties of a content data request made by a client computer system;
preparing the instruction data set having the specified instruction format at a server computer system, wherein the instruction data set comprises a plurality of instruction element data sets each representing a specified instruction element of the specified instruction format;
searching a tree data structure stored in an instruction format configuration file at the server computer system, wherein the tree data structure comprises a plurality of instruction format nodes, each instruction format node indicating a specified combination of instruction elements including the specified instruction format and having associated with it a node selection criterion, with said determined content data request properties and for selecting an instruction format node whose associated node selection condition matches said determined content data request properties; and
preparing the instruction data set to be sent to the client computer system by executing instruction element generating applications of the selected instruction format node and inserting content data in places indicated by the instruction element generating application of the selected instruction format node.

23. The method according to claim 22, further comprising the step of analyzing said content data request to provide said at least one client unit related properties and content data related properties.

24. The method according to claim 23, further comprising the steps of:
providing for each client as said client unit related properties device properties about the client;
providing as said content data related properties, resource properties about data content resources providing the content data;
providing as said client unit related properties, properties about the content data requesting unit used at the client; and
providing as said client unit related properties, properties about commands issued at the client.

25. The method according to claim 23, wherein a memory is provided which includes a first property storage area for said client unit related properties and a second storage area for said content data related properties.

26. The method according to claim 25, further comprising the step of analyzing a first content data request to obtain said client unit related properties and said content data related properties, wherein at an arrival of any subsequent content data request in a same session, one of said first storage area and said second storage area is accessed to provide said at least one of client unit related properties and said content data related properties.

27. The method according to claim 23, wherein said node selection condition comprises at least one node selection requirement including at least one property name parameter and an expected property;

wherein said search is started at a root instruction format node;

wherein a property relating to said property name parameter of said node selection condition of a next instruction format node is requested to be provided for the current data request; and wherein when said provided property matches with said expected property, said instruction format selection branches to said next instruction format node.

28. The method according to claim 27, wherein said node selection requirement further comprises a property type parameter indicating a type of property provided.

29. The method according to claim 27, wherein said node selection condition further comprises at least one operation condition for logically combining results of at least two requirements.

30. The method according to claim 22, wherein said instruction format formed by instruction elements of a root instruction format node of said tree data structure is a default instruction format.

31. The method according to claim 30, wherein said default instruction format is an instruction format with an instruction template and a plurality of instruction element positions into which the instruction element generating applications insert instruction element data sets when they are executed.

32. The method according to claim 22, wherein said instruction format includes an instruction template and a plurality of instruction element positions into which said instruction element generating applications insert instruction element data sets when they are executed.

33. The method according to claim 22, wherein said instruction element generating application includes a component name of a component to be executed.

34. The method according to claim 33, wherein said instruction element generating applications further include an argument name with a substitution name of a substitution component located at a different node.

35. The method according to claim 32, wherein said instruction data set is a set of instruction data for displaying a screen with a particular screen layout format on the client, wherein said instruction template is a screen layout template and said instruction element positions are place holders into which said insert screen element data sets are inserted by said instruction element generating applications when said instruction element generating applications are executed.

36. The method according to claim 32, wherein said instruction data set is a set of instruction data for controlling a device with a specified control command layout format on the client, wherein said instruction template is a command layout template and said instruction element positions are command holders into which said instruction element generating applications insert command data sets when said instruction element generating applications are executed.

37. The method according to claim 32, wherein the client and the server are JAVA based applications, and wherein said instruction format configuration file containing said tree data structure is an XML file.

38. A computer-readable memory device encoded with a tree data structure having entries which are accessed by a program that provides at least one client by a server in a client and server system, with an instruction data set in a specified instruction format in response to a content data request, wherein the program is encoded in the memory device and is run by a processor, the entries comprising:

a plurality of instruction format nodes, each instruction format node indicating a specified combination of instruction elements including a particular instruction format and having associated with it a node selection criterion and a server computer system executes the program to insert content data in places indicated by an instruction element generating application of at least one instruction format node selected from the plurality of instruction format nodes.

39. The device according to claim 38, wherein the tree data structure is generated separately for each session between the client and the server.

40. The device according to claim 38, wherein said tree data structure is generated once and independently for each session between the client and the server.

41. The device according to claim 38, wherein said tree data structure is generated dependent on at least one of client-related properties and content data properties.

42. A method in a data processing system for providing one or more clients by a server in a client and server system, with an instruction data set in a specified instruction format in response to a content data request, comprising the steps of:

preparing a tree data structure consisting of a plurality of instruction format nodes at a server computer system, each instruction format node indicating a particular combination of instruction elements including a specified instruction format and having associated with it a node selection criterion;

searching said tree data structure with content data request properties relating to the content data request sent by a client computer system and for selecting an instruction format node whose associated node selection condition matches said content data request properties; and inserting content data in places indicated by an instruction element generating application of the selected instruction format node.

43. A method in a data processing system for providing one or more clients by a server in a client and server system, with an instruction data set in a specified instruction format, comprising the steps of:

selecting from a plurality of instruction format templates a specified instruction format template dependent on at least one of a client computer system property and a resource property, wherein said template describes at what places in the instruction data set specified instruction elements can be placed, wherein the selection is performed on a server computer system; and inserting content data in the places indicated in said instruction format template by at least one instruction element generating application, wherein an instruction data set in accordance with said instruction format is sent to a client computer system;

wherein the selection comprises selecting said at least one instruction element generating application in accordance with one of client capabilities and resource capabilities, from more than one available instruction element generating application.

44. A data processing system in a client and server system, the server providing the client with an instruction data set in a specified instruction format in response to a content data request from the client, the system comprising:

a server computer system comprising:

a memory including a server program that provides one or more content data request properties of the content data request made by the client, that prepares the instruction data set having the specified instruction format and including a plurality of instruction element data sets each representing a specified instruction element of the instruction format and generated by at least one instruction element generating application in an instruction format set up sequence, that includes an instruction format configuration file containing a tree data structure including a plurality of instruction format nodes, each of the instruction format nodes indicating a particular combination of instruction elements having the specified instruction format and having associated with it a node selection criterion, that searches said tree data structure with said determined content data request properties and selects an instruction format node whose associated node selection condition matches said determined content data request properties, and that prepares the instruction data set to be sent to the client by executing the instruction element generating application of the selected instruction format node and inserting content data in places indicated by the instruction element generating application of the selected instruction format node; and a processor that runs said server program;

a client computer system comprising:

a memory including a client program that provides a content data request to the server, and that receives the instruction data set sent by the server; and a processor that runs said client program; and a network between said server computer and said client computer.

45. An apparatus which provides, in a client and server system, at least one client by a server computer with an instruction data set in a specified instruction format in response to a content data request, comprising:

means for providing at least one content data request properties of a content data request made by a client computer system;

means for preparing the instruction data set having the specified instruction format at a server computer system, wherein the instruction data set comprises a plurality of instruction element data sets each representing a specified instruction element of the specified instruction format;

means for searching a tree data structure stored in an instruction format configuration file and including a plurality of instruction format nodes, each instruction format node indicating a specified combination of instruction elements including the specified instruction format and having associated with it a node selection criterion, with said determined content data request properties and for selecting an instruction format node whose associated node selection condition matches said determined content data request properties; and means for preparing the instruction data set to be sent to the client computer system by executing instruction element generating applications of the selected instruction format node and inserting content data in places indicated by an instruction element generating application of the selected instruction format node.

* * * * *